US008982809B2

(12) United States Patent
Seo et al.

(10) Patent No.: US 8,982,809 B2
(45) Date of Patent: Mar. 17, 2015

(54) METHOD AND APPARATUS FOR RESOURCE MANAGEMENT IN A RELAY COMMUNICATION SYSTEM, AND METHOD AND APPARATUS FOR DATA RELAY USING SAME

(75) Inventors: Han-Byul Seo, Gyeonggi-Do (KR); Dan Keun Sung, Daejeon (KR); Su Min Kim, Daejeon (KR); Seong Hwan Kim, Daejeon (KR); Su Ha Yoon, Daejeon (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 720 days.

(21) Appl. No.: 13/266,766

(22) PCT Filed: Apr. 28, 2010

(86) PCT No.: PCT/KR2010/002672
§ 371 (c)(1),
(2), (4) Date: Oct. 27, 2011

(87) PCT Pub. No.: WO2010/126297
PCT Pub. Date: Nov. 4, 2010

(65) Prior Publication Data
US 2012/0044828 A1 Feb. 23, 2012

(30) Foreign Application Priority Data

Apr. 28, 2009 (KR) .................. 10-2009-0037306
Sep. 25, 2009 (KR) .................. 10-2009-0091290

(51) Int. Cl.
*G01R 31/08* (2006.01)
*H04L 1/00* (2006.01)
(Continued)

(52) U.S. Cl.
CPC .......... *H04L 1/0017* (2013.01); *H04B 7/15521* (2013.01); *H04L 1/0003* (2013.01);
(Continued)

(58) Field of Classification Search
CPC . H04W 28/00; H04W 28/0268; H04W 28/02; H04W 28/16; H04W 72/00; H04W 72/04; H04W 72/042; H04W 74/00; H04W 74/002; H04W 84/00
USPC ............. 370/310, 310.2, 313, 315, 322, 328, 370/326, 329, 332, 336, 465, 252
See application file for complete search history.

(56) References Cited

U.S. PATENT DOCUMENTS 7,929,479 B2 * 4/2011 Youn et al. .................... 370/315
7,944,919 B2 * 5/2011 Connors et al. ............... 370/390
(Continued)

FOREIGN PATENT DOCUMENTS

JP 2006-246002 9/2006
KR 1020060124401 12/2006
KR 1020080076625 8/2008

*Primary Examiner* — Anh Ngoc Nguyen
(74) *Attorney, Agent, or Firm* — Lee, Hong, Degerman, Kang & Waimey

(57) ABSTRACT

Disclosed is a method for transmitting integrated packet data by a relay station (RS) in a multi-hop relay communication system, including: integrating a plurality of packet data received from mobile stations (MSs) and determining a data integration scheme for transmitting the integrated data to base station (BS); receiving packet data from MSs, classifying the received packet data into one or more integration packet classes according to the determined data integration scheme, and storing the same; determining QoS (Quality of Service) requirements and a MCS (Modulation and Coding Scheme) level of the stored integration packet classes; calculating required resource according to the determined MCS level and requesting an allocation of the resource from the BS; receiving an approval for resource allocation from the BS, and modulating and coding the integrated packet class, mapping the same to the resource to configure an integrated packet; and transmitting the configured integrated packet to the BS.

11 Claims, 11 Drawing Sheets

(51) Int. Cl.
*H04B 7/155* (2006.01)
*H04L 12/24* (2006.01)
*H04L 12/911* (2013.01)
*H04W 28/06* (2009.01)
*H04W 28/04* (2009.01)
*H04W 40/12* (2009.01)
*H04W 72/04* (2009.01)
*H04W 72/08* (2009.01)
*H04W 84/04* (2009.01)

(52) U.S. Cl.
CPC .......... *H04L41/5019* (2013.01); *H04L 47/824* (2013.01); *H04W 28/06* (2013.01); *H04L 2001/0097* (2013.01); *H04W 28/04* (2013.01); *H04W 40/12* (2013.01); *H04W 72/0426* (2013.01); *H04W 72/087* (2013.01); *H04W 84/047* (2013.01)
USPC .......................................................... 370/329

(56) References Cited

U.S. PATENT DOCUMENTS

2007/0237107 A1* 10/2007 Jang et al. ..................... 370/315
2008/0198814 A1*  8/2008 Wengerter et al. ............ 370/336

* cited by examiner

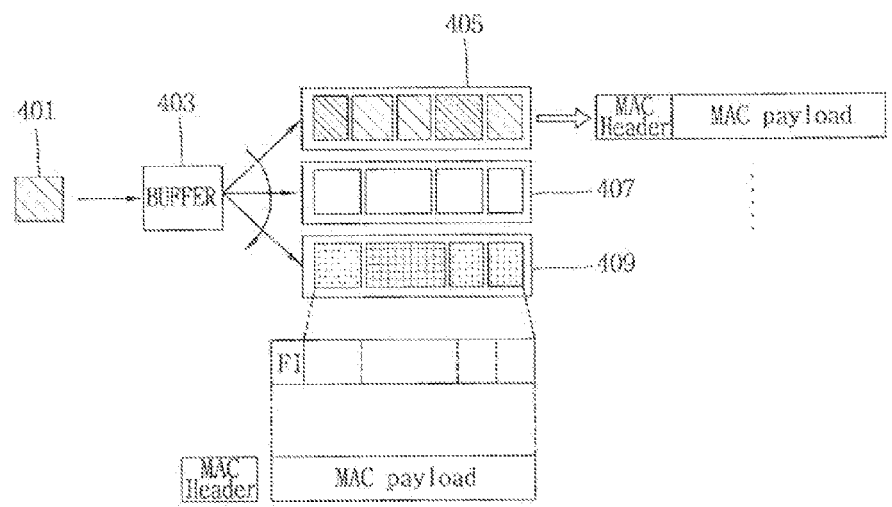

FIG. 17
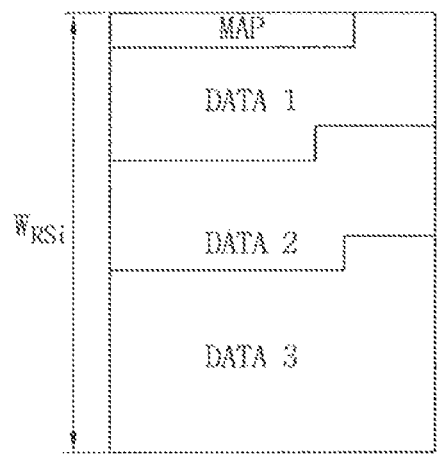
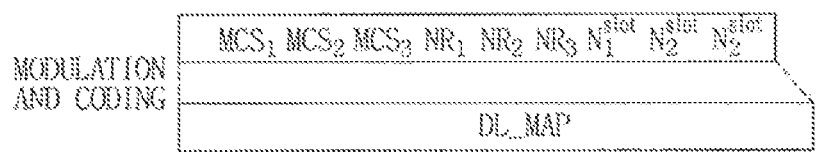
FIG. 18
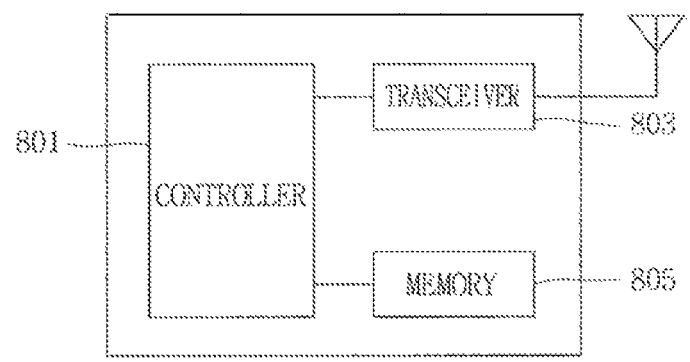

US 8,982,809 B2

METHOD AND APPARATUS FOR RESOURCE MANAGEMENT IN A RELAY COMMUNICATION SYSTEM, AND METHOD AND APPARATUS FOR DATA RELAY USING SAME

CROSS-REFERENCE TO RELATED APPLICATIONS

This application is the National Stage filing under 35 U.S.C. 371 of International Application No. PCT/KR2010/002672, filed on Apr. 28, 2010, which claims the benefit of earlier filing date and right of priority to Korean Application Nos. 10-2009-0091290, filed on Sep. 25, 2009, and 10-2009-0037306, filed on Apr. 28, 2009, the contents of which are all hereby incorporated by reference herein in their entirety.

TECHNICAL FIELD

The present invention relates to a multi-hop relay system and, more particularly, to a radio resource management technique in an uplink data transmission between a relay station and a base station and a method and apparatus for classifying packets received from a mobile station by a relay station according to QoS (Quality of Service) requirements to reconfigure an integrated packet, and effectively transmitting the same to a base station.

BACKGROUND ART

In a wireless communication system, recently, a service frequency band is gradually raised and a cell radius is gradually reduced in order to smoothly support high speed data communication and accommodate greater traffic, so the operation of an existing centralized cellular wireless network scheme involves much problem. Namely, in the related art method in which the location of a base station (BS) is fixed, flexibility of configuration of a radio link deteriorates, failing to provide an effective communication service in a wireless environment in which a traffic distribution or traffic demand (or call volume) are severely changed.

Thus, a next-generation communication system is required to be distributedly controlled and established and actively cope with a change in an environment such as an addition of a new base station. In order to solve such a problem, a multi-hop relay has been proposed. A multi-hop relay system has advantages in that it can expand a cell service area by covering a local shadow area generated in the cell area, increase a system capacity, and reduce a burden of initial installation costs by using a relay (or a relay station) in an initial situation requiring a small amount of service demand.

FIG. 1 is a view showing a general multi-hop cellular system.

In the multi-hop cellular system, when a mobile station (MS) is distant from a BS or a signal transmission is not smooth due to an obstacle such as a building, or the like, a signal of the MS is relayed to the BS through a relay station (RS), thus increasing cell coverage and resolving a shadow area. As illustrated, when a relay network is configured with two-hop link between a BS 101 and MSs 133, 135, 137, and 139, signals of the MSs are primarily transferred to an RS 121 through the link between the MSs 133, 135, 137, and 139 and the RS 121 and then the RS 121 receives packet data from the plurality of MSs and secondarily relays the signals 141, 143, 145, and 147 received from the MSs to the BS 101 through the link between the RS 121 and the BS 101.

When the RS 121 is used as shown in FIG. 1, resources should be shared to be used by the MSs 133, 135, 137, and 139 and the RS 121 and by the RS 121 and the RBS 101, in comparison to an existing data transmission and reception through a direct link between the BS 101 and the MS 131. Also, when a plurality of RSs 121 and 123 exist, since resources must be shared by RSs, the use of resource is more limited. Thus, in the system using the RS 121, the process of allocating resource and requesting resource are considerably complicated and much signaling overhead is required in comparison to the system using the direct link between the BS 101 and the MS 131. Thus, when the RS 121 is to process the packets 141, 143, 145, and 147 of the plurality of MSs 133, 135, 137, and 139, resource efficiency is degraded and delay is lengthened. In order to solve this problem, a method of integrating the packet data 141, 143, 145, and 147 received by the RS 121 from the MSs 133, 135, 137, and 139 and transferring the same to the BS 101 may be considered.

However, as illustrated, when the RS 121 receives the various packets 141, 143, 145, and 147 from the plurality of MSs 133, 135, 137, and 139 belonging to its area and relays them to the BS 101, the plurality of MSs 133, 135, 137, and 139 use various services such as VoIP 141, data streaming 143, a messenger 145, a file transfer protocol (FTP) 147, Web searching, a video conference service, and the like, as well as simple voice communication, so the packets 141, 143, 145, and 147 transmitted by the MSs 133, 135, 137, and 139 may require various QoS (Quality of Services) according to service types. Thus, if the RS 121 simply integrates the packets received from the MSs and relays them to the BS 101, QoS requirements with respect to various services within the integrated packet could not be met, and when there occurs a frame transmission error of the integrated packet, a data retransmission technique such as a hybrid automatic retransmission request (HARQ) for retransmitting the frame having an error cannot be positively utilized.

FIG. 2 shows a scheme in which the RS 121, which has received various packets 141, 143, 145, and 147 from the plurality of MSs 133, 135, 137, and 139, individually relays the corresponding packets 201, 203, 205, and 207 accumulated in its queue 200 without an integration procedure. As illustrated, the RS 121 accumulates the packets received from the MSs in its queue 200 and individually transfers the packets 201, 203, 205, and 207 to the BS 101 in consideration of a transmission time interval (TTI). In order for the RS to transmit the packets to the BS, a process of requesting resource by the RS from the BS and receiving allocated resource is required, and in this case, the RS should inform the BS about a modulation and coding scheme (MCS) level of transmitted data, address information of the data, an ID of the RS itself (RSID), and the like, through a signaling procedure. However, as shown in FIG. 2, when the packets 201, 203, 205, and 207 to be transmitted to the BS are individually transmitted, resources must be allocated separately over all of the packets, and modulation and coding are performed on each of the packets, increasing complexity in the packet processing and generating signaling overhead and delay.

IEEE 802.16j standard proposes two types of multi-access scheme, i.e., a scheduling scheme and a dedicated channel allocation scheme, with respect to an RS-BS link.

The scheduling scheme is channel-adaptively operated, allowing resources to be effectively used, but overhead and delay may increase due to the resource requesting and allocation process. In addition, according to the scheduling scheme, the MS must perform a resource requesting and allocation process before transmitting data to uplink, i.e., the BS, an access delay and signaling overhead are increased.

Also, when the existing scheduling scheme is applied to the RS-BS link as well as to the MS-RS link, the resource requesting and allocation process are inevitably repeatedly performed by the RS and the BS, aggravating the access delay and signaling overhead. Also, in a centralized scheduling scheme and a distributed scheduling scheme for reducing latency, among the scheduling schemes, an aggregation of individual traffic is not considered in the RS, so a resource allocation and data transmission to the BS with respect to a request of the MS is individually made. Such an individual transmission is not efficient compared with the aggregation transmission by the RS, increasing signaling overhead.

Also, as for traffic at the RS, since traffics of MSs belonging to each RS are aggregated, the amount of traffic is large compared with the MSs and a variation is relatively small. However, the existing scheduling scheme does not reflect the characteristics of the RS-BS channels, and although the variation in the amount of traffic and channels of the RS-BS link is small, the RS and the BS simply repeatedly perform scheduling, the signaling overhead and access delay increase as mentioned above.

Meanwhile, in the dedicated channel allocation scheme, data can be immediately transmitted by using exclusively allocated resource without additional signaling, reducing overhead and delay, but since the dedicated channel allocation scheme cannot be adoptively operated for each channel, it is ineffective in using resources. Also, like the scheduling scheme, resource allocation is not made based on the entire RSs included in the BS but resource is allocated according to a corresponding request from an individual RS, and since the real-time and non-real time traffic characteristics are not considered, resource is ineffectively used.

DISCLOSURE

Technical Problem

Therefore, an aspect of the present invention provides a method and apparatus for preventing generation of signaling overhead and delay when a relay station (RS) individually transfers data received from a mobile station (MS) to a base station (BS), effectively integrating, by the RS, data received from MSs in consideration of QoS requirements, and transferring the same to the BS.

Another aspect of the present invention solves inefficiency due to overhead and delay, the problems of the related art scheduling-based multi-access scheme and dedicated channel allocation-based multi-access scheme.

Technical Solution

According to an aspect of the present invention, there is provided a method for transmitting integrated packet data by a relay station (RS) in a multi-hop relay communication system, including: integrating a plurality of packet data received from mobile stations (MSs) and determining a data integration scheme for transmitting the integrated data to base station (BS); receiving packet data from MSs, classifying the received packet data into one or more integration packet classes according to the determined data integration scheme, and storing the same; determining QoS (Quality of Service) requirements and a MCS (Modulation and Coding Scheme) level of the stored integration packet classes; calculating required resource according to the determined MCS level and requesting an allocation of the resource from the BS; receiving an approval for resource allocation from the BS, and modulating and coding the integrated packet class, mapping the same to the resource to configure an integrated packet; and transmitting the configured integrated packet to the BS.

The data integration scheme determined in the data integration scheme determining step may be determined based on data delay requirements and FER (Frame Error Rate) requirements.

The QoS requirements of the integration packet class may include the delay requirements and FER requirements, and the delay requirements $D_{CONST,Agg}^{RS-BS}$ of the integration packet may be determined as Equation $D_{CONST,Agg}^{RS-BS} = E[D_{CONST}^{RS-BS}] - \alpha$ obtained by considering a loss compensation coefficient ($\alpha$) in an average value of the delay requirements $D_{CONST}^{RS-BS}$ of particular packets having certain percentile among delay requirements of n number of particular packets.

The determining of the QoS requirements and the MCS level of the integration packet class may include: determining a maximum number of allowable retransmissions for an HARQ (Hybrid Automatic Retransmission request), wherein the maximum number of allowable retransmissions may be determined in consideration of a transmission delay consumed for transmitting a frame in an RS-BS link, a processing delay required for processing a transmission of a frame in the RS-BS link, and a delay time taken for providing a corresponding packet from the RS.

The MCS level may be determined in consideration of both the maximum number of allowable retransmissions $N_{max}^{RS-BS}$ and the FER requirements.

In configuring the integration packet, the BS may designate positions to which one or more integration packet classes included in the integration packet are to be mapped in the allocated resource domain and inform the RS about the positions through a downlink map.

According to another aspect of the present invention, there is provided a method for transmitting data by a relay station (RS) in a multi-hop relay communication system, including: determining a data integration scheme for integrating a plurality of packet data received from mobile stations (MSs) and transmitting the integrated packet data to base station (BS); receiving packet data from MSs, classifying the received packet data into one or more integration packet classes according to the determined data integration scheme, and storing the same; determining QoS (Quality of Service) requirements and a MCS (Modulation and Coding Scheme) level of the stored integration packet classes; calculating required resources according to the determined MCS level and requesting an allocation of the resources from the BS; receiving allocated resources from the BS and mapping the resources allocated by the BS to each of the integration packet classes according to the amount of traffic and an MCS level of the integration packet classes; and transmitting information regarding the MCS level and the positions of the resources mapped to the integration packet classes to the BS through an uplink map.

The data integration scheme determined in the data integration scheme determining step may be determined based on data delay requirements and FER (Frame Error Rate) requirements.

The QoS requirements of the integration packet class may include the delay requirements and FER requirements, and the delay requirements $D_{CONST,Agg}^{RS-BS}$ of the integration packet may be determined as Equation $D_{CONST,Agg}^{RS-BS} = E[D_{CONST}^{RS-BS}] - \alpha$ obtained by considering a loss compensation coefficient ($\alpha$) in an average value of the delay requirements $D_{CONST}^{RS-BS}$ of particular packets having certain percentile among delay requirements of n number of particular packets.

The determining of the QoS requirements and the MCS level of the integration packet class may include: determining a maximum number of allowable retransmissions for an HARQ (Hybrid Automatic Retransmission request), wherein the maximum number of allowable retransmissions may be determined in consideration of a transmission delay consumed for transmitting a frame in an RS-BS link, a processing delay required for processing a transmission of a frame in the RS-BS link, and a delay time taken for providing a corresponding packet from the RS.

The MCS level may be determined in consideration of both the maximum number of allowable retransmissions $N_{max}^{RS-BS}$ and the FER requirements.

According to another aspect of the present invention, there is provided an apparatus for transmitting integration packet data by a relay station (RS) to relay data of a mobile station (MS) to a base station (BS) in a multi-hop relay communication system, including: a transceiver transmitting and receiving data to and from the MS and the BS; a memory storing a certain data integration scheme for integrating the data transmitted to the MS and received from the BS and a plurality of packet data received from the MS according to a certain scheme so as to be transmitted to the BS; and a controller configuring an integration packet in order to transmit data received from the MS to the BS and controlling a data transmission and reception, wherein the controller classifies packet data received by the transceiver into one or more integration packet classes according to the data integration scheme and stores the same, modulates and codes the integration packet classes to configure the integration packet, and transmits the configured integration packet to the BS through the transceiver.

The controller may determine the data integration scheme including one or more integration packet classes based on data delay requirements and FER (Frame Error Rate) requirements, and store the determined data integration scheme in the memory.

The controller may determine the delay requirements and the FER requirements of the integration packet class, and the delay requirements $D_{CONST,Agg}^{RS-BS}$ of the integration packet may be determined as Equation $D_{CONST,Agg}^{RS-BS} = E[D_{CONST}^{RS-BS}] - \alpha$ obtained by considering a loss compensation coefficient ($\alpha$) in an average value of the delay requirements $D_{CONST}^{RS-BS}$ of particular packets having certain percentile among delay requirements of n number of particular packets.

The controller may determine a maximum number of allowable retransmissions for an HARQ (Hybrid Automatic Retransmission request), and the maximum number of allowable retransmissions may be determined in consideration of a transmission delay consumed for transmitting a frame in an RS-BS link, a processing delay required for processing a transmission of a frame in the RS-BS link, and a delay time taken for providing a corresponding packet from the RS.

In order to enhance efficiency in a link between a BS and an RS, dedicated resource may be periodically allocated at every particular time window Tw in consideration of a channel situation and a traffic situation with respect to the link between the RS and the BS (or RS-BS link).

The reason for allocating the dedicated resource at every particular time window Tw is that the RS-BS link is a channel used for transmitting aggregation traffic obtained by adding traffics (or data) received from MSs, and since the aggregation traffic having a relatively large size compared with an MS-RS link is transmitted, the size of the transmission data is large and a variation is small. Another reason is that if the RS is a fixed RS, it has channel characteristics which are LOS (Line-of-Sight) or slightly varied, having a channel situation better than the MS-RS link, so a higher MCS than that of the MS-RS link can be used.

In consideration of this characteristics, the present invention proposes a window-based virtual bandwidth multi-access (W-VBMA) scheme in which resources are allocated and managed based on the size of a band requested by an RS updated at every particular time window with respect to an RS-BS link.

In detail, the present invention provides a method for managing resources by a relay station (RS). The method includes: receiving information regarding a time window Tw from a base station (BS); requesting allocation of required bands from the BS within the time window; distributedly allocating the allocated bands to one or more MSs based on the allocated bands; and requesting reallocation of bands from the BS when an additional bandwidth is required although the time window is yet to arrive.

The present invention provides a method for allocating resources by a base station (BS) to a relay station (RS). This method includes: receiving requests for band allocation from one or more RSs; allocating bands to the one or more RSs within a predetermined time window; and reallocating bands to the one or more RSs when a request for band reallocation is received from the one or more RSs before the predetermined time window.

Also, the present invention provides a method for allocating resources to a mobile station (MS) by a base station (BS) or a relay station (RS). This method includes: receiving a request for band allocation from one or more MSs; allocating bands to the one or more MSs within a predetermined time window; and reallocating bands to one or more MSs when a request for band reallocation is received from the one or more MSs before the predetermined time window arrives.

Advantageous Effects

According to embodiments of the present invention, since an RS transfers data received from MSs to a BS through effective data integration in consideration of QoS requirements, signaling overhead can be reduced and generation of delay can be prevented.

Also, since an integration packet is configured to satisfy QoS requirements with respect to various services, when a frame transmission error of an integration packet occurs, a data retransmission technique such as a HARQ (Hybrid Automatic Retransmission request), or the like, can be positively utilized in order to retransmit the frame having an error.

In addition, in consideration of channel and traffic characteristics according to the introduction of an RS, the size of dedicated resources are adjusted and managed based on the amount of traffic of each RS at every particular time window with respect to an RS-BS link, thereby reducing delay and signaling overhead required for a transmission in every frame.

The RS discriminates real-time traffic and non-real time traffic and preferentially process real-time traffic, thus reducing signaling overhead and delay with respect to the real-time traffic, and when the amount of real-time traffic is small, the RS allocates most of the allocated resource to non-real time traffic, thereby effectively operate the dedicatedly allocated resource for the non-real time traffic.

Also, since an MCS level can be newly determined to be changed at every time window, the efficiency of using resource over a change in channel can be enhanced in comparison to the existing dedicated channel allocation scheme using fixed MCS level.

Finally, when a great amount of resources are suddenly required due to a sudden increase in traffic, the RS determines the corresponding situation and transmits a reallocation request message to the BS, so that resource can be immediately reallocated. Accordingly, although traffic is rapidly increased at a particular RS, the ineffective aspect of the dedicated channel allocation scheme can be overcome and the RSs can equally use resources.

DESCRIPTION OF DRAWINGS

FIG. 3 is a view showing packet data classified into a plurality of classes according to service requirements;

FIG. 4 is a view showing a process of configuring an integration packet by using the classes classified according to QoS requirements;

FIG. 13 is a view showing the structure of an uplink subframe of a BS according to an embodiment of the present invention;

FIG. 14 is a view showing the structure of an uplink subframe of an RS according to an embodiment of the present invention;

FIG. 17 is a view showing a method for mapping resources of an integration packet according to an embodiment of the present invention; and FIG. 18 is a schematic block diagram of a data transmission apparatus according to an embodiment of the present invention.

BEST MODES

Figure 1:
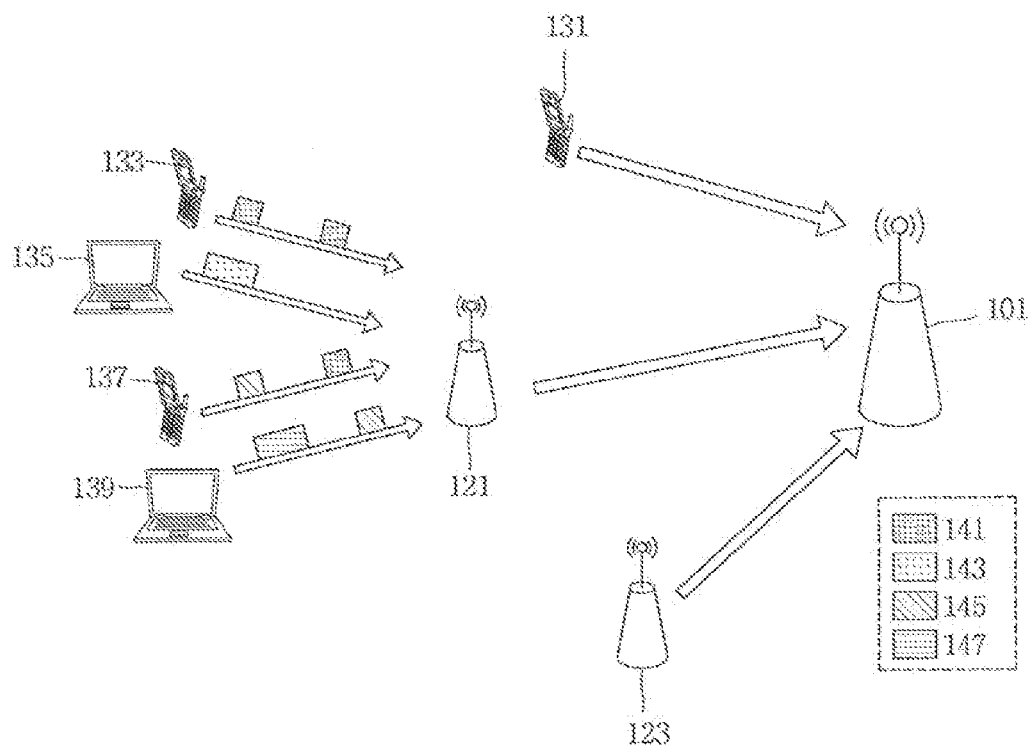
FIG. 1 is a view showing a multi-hop cellular system.
Figure 2:
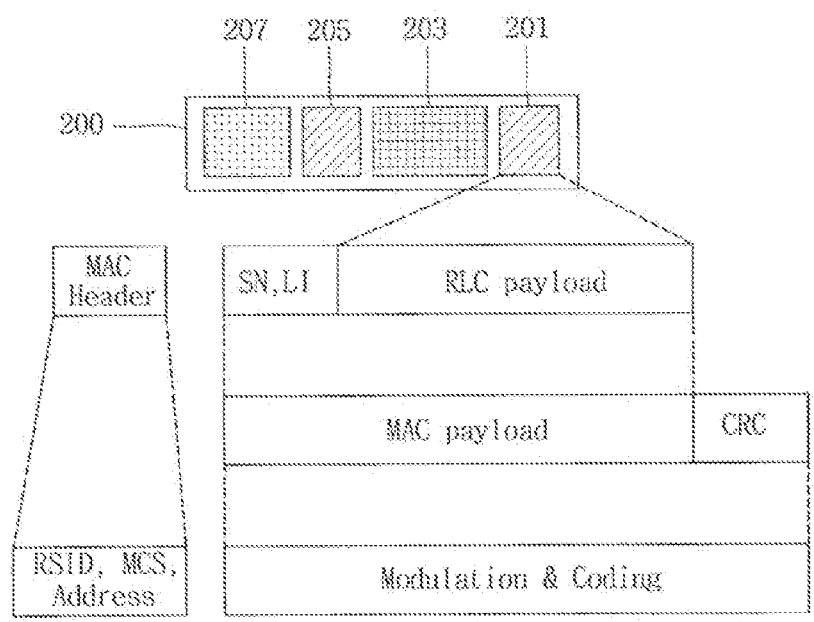
FIG. 2 is a reference view for explaining a method of individually relaying each packet stored in a queue of a relay station (RS) to a base station (BS)

The embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

A communication system according to an embodiment of the present invention is a system for providing various communication services such as voice and packet data, or the like, and includes a base station (BS), a relay node (RN), and a mobile station (MS), and an IEEE802.16 system will be described as a representative example.

A terminal according to an embodiment of the present invention may be referred to by other names such as subscriber station (SS), user equipment (UE), mobile equipment (ME), mobile station (MS), or the like. Also, the terminal may be a portable device such as a mobile phone, a PDA, a smartphone, a notebook computer, and the like, or a non-portable device such as a PC or a vehicle-mounted device.

A relay station (RS) according to the present document may be called by other names such as relay, repeater, relay node, or the like. The RS is installed between a BS and an MS to relay transmission and reception signals to cover a local shadow area generated in a cell area, expand cell service coverage, and increase system capacity. The RS may be configured as multiple hops to effectively relay data traffic generated between the BS and the MS, and may be fixed to a position so as to be operated, or may have mobility. Also, the RS may be operated in a full duplex mode in which transmission and reception bands are separated or a half duplex mode in which transmission and reception time sections are separated, or may be operated as a non-transparent type I RS or a transparent type II RS.

A base station according to the present document refers to a fixed point communicating with an MS and may be called by other names such as eNB (evolved-NodeB), NB (NodeB), BTS (base transceiver system), access point, or the like. One or more cells may exist in a BS, and an interface may be used for transmitting user traffic or control traffic between BSs. Also, downlink refers to a communication channel from a BS to an RS and/or an MS, and uplink refers to a communication channel from an RS and/or an MS to a BS.

A multiple access scheme applied to the wireless communication system according to an embodiment of the present invention includes CDMA (code division multiple access), TDMA (time division multiple access), FDMA (frequency division multiple access), SC-FDMA (single carrier frequency division multiple access), OFDMA (orthogonal frequency division multiple access), or any other known modulation techniques.

Also, multiple access schemes for downlink transmission and uplink transmission may be different. For example, downlink may use OFDMA while uplink may use SC-FDMA.

The embodiments of the present invention will now be described with reference to the accompanying drawings, in which like numbers refer to like elements throughout.

I. Classification of Data Service

Various application services generally generated in a communication environment may be classified into four groups having similar QoS requirements as shown in Table 1 below.

TABLE 1

| Service group | Application service |
|---|---|
| Conversational service | Telephony speech, VoIP, video conference |
| Streaming service | Video streaming, etc. |

TABLE 1-continued

| Service group | Application service |
| --- | --- |
| Interactive service | Web searching, server access, etc. |
| Background service | E-mail, facsimile, FPT, etc. |

As shown in Table 1, applications services may be classified into a conversational service, a streaming service, an interactive service, and a background service. The conversional service refers to a service such as a voice call, VoIP (Voice over IP), video conference, or the like, which requires a low-speed data rate, but it has characteristics that it relatively strictly limits allowable transmission delay. The streaming service refers to a service such as video streaming, or the like, such as VOD (Video on Demand), or the like. This service requests not much delay distribution of packets arriving at a receiver and limits allowable delay requirements to a degree although it is not as strict as the conversational service. The interactive service corresponds to a service such as Web searching, server accessing, or the like. This service has a limitation of a round trip delay and requests a low BER (Bit Error Rate). The background service corresponds to a service such as an e-mail, facsimile, or FTP (File Transfer Protocol), or the like. This service is not sensitive to delay but has low BER requirements.

An RS receives various application services as mentioned above from a plurality of MSs and relays the same to a BS. In this case, the RS classifies received packet data into classes according to similar QoS requirements to reconfigure it as an integration packet, and transfers the reconfigured integration packet to the BS.

The various application services may be classified into sub-classes as shown in FIG. 3 based on FER (Frame Error Rate) requirements and delay requirements among QoS (Quality of Service) requirements.

FIG. 3 is a view showing packet data classified into a plurality of classes according to service requirements.

In FIG. 3, the reference service requirements are indicated as FER requirements and delay requirements, and groups that relatively strictly require the FER requirements may be classified into Class B and groups that does not strictly require FER requirements may be classified into Class A. Application services belonging to Class A are mostly voice services which are error-tolerant, and the application services belonging to Class B are mostly data services which are error-intolerant.

Similarly, groups may be classified according to delay requirement into Class 1 (delay<<1 sec) having a very strict reference, Class 2 (delay≈1 sec) having a somewhat strict reference, Class 3 (1 sec<delay<10 sec) having a lessened reference, and Class 4 (delay>10 sec) considered actually not to have a limitation in delay requirements. As for the characteristics of the services corresponding to each class, as their delay requirements are stricter, the services belong to real-time services, and as their delay requirements are lessened, the services belong to non-real time services. In consideration of the foregoing two types of service requirements, the classes may be classified into a total of eight subclasses as illustrated.

Class A1 is a real-time service featuring lessened FER requirements and very strict delay requirements, mainly including a conversational service such as voice, voice and video, or the like. Class B1 features strict FER requirements and very strict delay requirements, and includes services such as Telnet, interactive games, or the like. Class A2 features lessened FER requirements and strict delay requirements, and includes a service such as a voice message, or the like.

Class B2 features strict FER requirements and strict delay requirements, and includes services such as E-commerce, Web browsing, or the like. Class A3 features lessened FER requirements and lessened delay requirements, and includes a streaming service, or the like. Class B3 features strict FER requirements and lessened delay requirements, and includes an FTP service, a still image, a paging service, or the like. Class A4 is a non-real time service featuring lessened FER requirements, including a service such as facsimile, or the like. Class B4 is a non-real time service featuring strict FER requirements, including an e-mail arrival notification service, or the like.

As for the classification described above with reference to FIG. 3, various packet data transmitted and received based on the MS are classified specifically according to the service requirements, and the RS appropriately integrates the specified classes according to operational conditions to configure a new integration packet and transfers the configured integration packet to the BS.

Hereinafter, a method for integrating various packets received by the RS from the MS into a new integration packet to relay it to the BS will be described.

II. Data Integration Scheme of RS

The RS stores a plurality of packets received from MSs in a queue, and thereafter, the RS integrates the plurality of packets into an integration packet including one or a plurality of integration packet classes according to QoS requirements and transmits the integration packet to the BS. The relay scheme of the RS through data integration can reduce resource requests between the RS and the BS, the number of data transmissions, and procedures generating signaling overhead such as control information transmission and reception. In this case, the packets received from the plurality of MSs include various QoS requirements according to service types, so, simply configuring an integration packet and transmitting it to the BS without consideration of the various QoS requirements, a data retransmission such as HARQ may not be properly performed. Thus, in order to effectively utilize a data retransmission scheme such as HARQ, or the like, in the occurrence of an error in a transmission packet while satisfying QoS requirements, an effective data integration scheme is required. Hereinafter, as for a method for configuring an integration packet by the RS, three types of schemes, namely, an integration packet configuration scheme through classification of six specified classes (a first integration scheme), an integration packet configuration scheme through classification of three simplified classes (a second integration scheme), and an integration packet configuration scheme through classification of two simplified classes (a third integration scheme), will be described.

1. First Integration Scheme

In the present embodiment, the RS classifies received data according to QoS requirements and specifically integrates data. Namely, the RS integrates packets having similar QoS requirements to configure a single integration packet, so there is not much difference between the QoS requirements of the packets received from the MSs and the QoS requirements of the integration packet reconfigured to be transmitted to the BS. Thus, even when there occurs a data error in a link between the RS and the BS in transmitting the integration packet, the integration packet can satisfy various QoS, whereby the data retransmission technique such as HARQ can be positively applied.

Table 2 below shows classification for a data packet integration according to an embodiment of the present invention.

TABLE 2

| Integration packet class | Characteristics of delay requirements (D) | Characteristics of FER requirements |
| --- | --- | --- |
| A | $D_A$: Strict delay requirements of real-time traffic | $FER_A$: Strict FER requirements |
| B | $D_B$: Strict delay requirements of real-time traffic | $FER_B$: Lessened FER requirements |
| C | $D_C$: Lessened delay requirements of non-real time traffic | $FER_C$: Strict FER requirements |
| D | $D_D$: Lessened delay requirements of non-real time traffic | $FER_D$: Lessened FER requirements |
| E | $D_E$: No delay requirements | $FER_E$: Strict FER requirements |
| F | $D_F$: No delay requirements | $FER_F$: Lessened FER requirements |

In Table 2, when $D_A$ to $D_F$ are delay requirements of the integration packet classes A to F, respectively, and $FER_A$ to $FER_F$ are FER requirements of integration packet classes A to F, respectively, the respective requirements have the relationship as expressed by Equation 1 and Equation 2 shown below.

$$D_A \approx D_B < D_C \approx D_D < D_E \approx D_F \quad \text{[Equation 1]}$$

$$FER_A \approx FER_C \approx FER_E \approx 0 < FER_B \approx FER_D \approx FER_F \quad \text{[Equation 2]}$$

As shown in Table 2, in the present invention, the delay requirements are classified into three levels, and the FER requirements are classified into two levels, so the integration packets can be classified into a total of six classes A, B, C, D, E, and F.

Classes A and B commonly require strict delay requirements of real-time traffic, but may have a difference in the FER requirements as expressed in Equation 2, so there may be a difference in selecting an MCS level.

Integration packet classes {A, B}, {C, D} and {E, F} have a difference in the delay requirements, so they have a difference in the number or retransmission that can be allowable at its maximum level, and this affects the MSC level selection, or the like. For example, classes {A, B} may be set as a group not allowing retransmission, and class {C, D} may be set as a group allowing for retransmission two to five times, and class {E, F} may be set as a group allowing for retransmission to its maximum level allowed by the system or may have a lower priority level than those of the other classes to wait until when there is room for using resource and then perform transmission. Preferably, the range of retransmission allowed by the system may be determined in consideration of power consumption.

In case of the method of specifically classifying the QoS requirements and integrating packets as shown in Table 2, HARQ environment variables, such as an MCS level, or the like, vary according to a small difference such as the number of retransmissions or FER requirements. Thus, the data integration method according to the present invention fits an environment that may greatly affect a difference in system performance according to an increase in the number of data retransmission. For example, in case of a mobile relay station environment, since channels are quickly changed, increasing a data error generation probability, data retransmission frequently occurs, and in this case, since the increase in the number of retransmissions also affects the system performance, the first integration method according to the present embodiment can be effectively applied.

2. Second Integration Scheme

The foregoing first integration scheme is advantageous in that it can effectively use HARQ when a channel environment is not good or when the RS is mobile, but since the classes of the integration packets are specifically classified, the number of integration classes is increased to increase signaling overhead.

Thus, in a fixed RS system having a relatively good channel state or little change in a link between the RS and the BS, the increase in the number of retransmissions does not greatly affect the system performance, so a simple integration scheme such as the second integration scheme proposed hereinafter may be more effectively applicable in comparison to the first integration scheme.

Table 3 below shows classification for a data packet integration according to the second integration scheme proposed in the present embodiment with reference to the service requirements for each class of FIG. 3.

TABLE 3

| Integration packet class | Characteristics of delay requirements (D) | Characteristics of FER requirements |
| --- | --- | --- |
| A | $D_A$: Strict delay requirements of real-time traffic | $FER_A$: Strict FER requirements |
| B | $D_B$: Strict delay requirements of real-time traffic | $FER_B$: Lessened FER requirements |
| C | $D_C$: Lessened delay requirements of non-real time traffic | $FER_C$: Appropriate FER requirements |

In Table 3, when $D_A$, $D_B$, $D_C$ are delay requirements of the respective integration packet classes A, B, and C, and $FER_A$, $FER_B$, and $FER_C$ are FER requirements of the respective packet classes A, B, and C, the respective requirements have a relationship as expressed by Equation 3 and Equation 4.

$$D_A \approx D_B < D_C \quad \text{[Equation 3]}$$

$$FER_A < FER_B \quad \text{[Equation 4]}$$

As shown in Table 3, in the present embodiment, the delay requirements are classified into two types of levels and the FER requirements are classified into three types of levels, so the entire integration packets can be classified into a total of three classes A, B, and C. among the FER requirements, an appropriate value of $FER_C$ can be obtained according to a plurality of classes included in the integration packet class C. For example, when it is designed such that all of the classes A2, B2, A3, B3, A4, and B4, among the plurality of classes illustrated in FIG. 3, are included in the integration packet class C, an appropriate FER requirements value of FERC is determined based on a slightly strict reference, and thus, $FER_C$ may be determined based on a reference similar to $FER_A$.

In Table 3, integration packet classes A and B require strict delay requirements, and HARQ retransmission is very limited. However, class C is a class which can positively use HARQ. Also, the classes A and B are classes differentiated in consideration of the fact that the MCS level may be set to be different according to FER requirements.

3. Third Integration Scheme

Table 4 below shows classification for data packet integration according to a third integration scheme proposed in the present embodiment with reference to the service requirements of each class of FIG. 3.

TABLE 4

| Integration packet class | Characteristics of delay requirements (D) | Characteristics of FER requirements |
|---|---|---|
| A | $D_A$: Strict delay requirements of real-time traffic | $FER_A$: Appropriate FER requirements |
| B | $D_B$: Lessened delay requirements of non-real time traffic | $FER_B$: Appropriate FER requirements |

In Table 4, when $D_A$ and $D_B$ are delay requirements of the respective integration packet classes A and B, and $FER_A$ and $FER_B$ are FER requirements of the respective packet classes A and B, the respective requirements may be appropriately set for a system, and the respective requirements have the following relationships. Here, the values of FER requirements may be appropriately determined according to which of the plurality of classes illustrated in FIG. 3 the respective integration packet classes include.

$$D_A < D_B \quad \text{[Equation 5]}$$

In the foregoing second integration scheme, class A and class B are divided according to the FER requirements, but in the third integration scheme according to Table 4, the classification of the integration packets are more simplified: the integration packets are divided only into class A corresponding to real-time traffic and class B corresponding to non-real time traffic.

As described above with reference to Table 2 to Table 4, the RS appropriately integrates various packet data received from MSs according to service requirements, to thereby effectively relay data.

FIG. 4 is a view showing a process of configuring an integration packet by using the classes classified according to QoS requirements. For the sake of brevity, the second integration scheme among the foregoing integration schemes, will be described as an example hereinafter.

When the RS receives a packet 401 from an MS, it stores the received packet 401 in a buffer 403, and then, classifies it to be stored in a corresponding class queue with reference to QoS requirements. In case of the second integration scheme, the integration packet class as shown in Table 3 can be divided into three classes of A, B, and C, and accordingly, the RS has three class queues 405, 407, and 409.

Packets having similar QoS requirements are stored in a single class queue, and the size of an integration packet is determined in consideration of the amount of traffic of each integration packet class, an MCS level of the integration packet, and resources allocated from a BS, and the like. When the size of the integration packet is determined, the integration packet is reconfigured as a frame, and frame information (FI) regarding a service data unit within the integration packet is added and a header (MAC header) including control information in an MAC terminal is added, thus completing an integrated packet frame.

Figure 5:
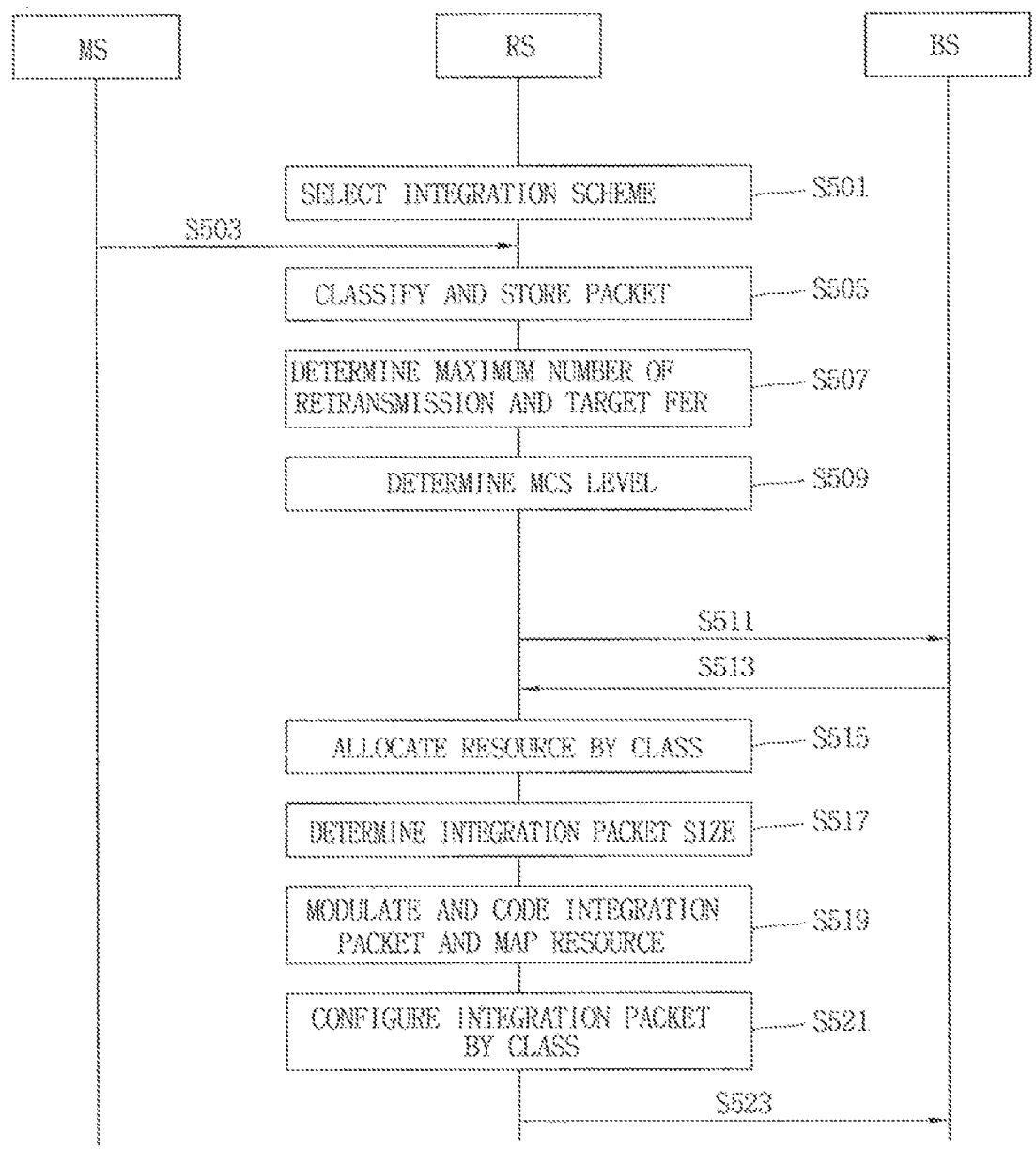
FIG. 5 is a view sequentially showing a process of configuring an integration packet by an RS and transmitting it to a BS.

FIG. 5 is a view sequentially showing a process of configuring an integration packet by an RS and transmitting it to a BS.

The RS determines a data integration scheme for integrating a plurality of packet data received from MSs and transmitting the integrated data to the BS (S501).

The determined data integration scheme may be one of the three integration schemes, and according to circumstances, the integration methods can be adaptively changed according to an RS-BS channel situation. Namely, when a channel environment is not good, the RS may determine the first integration scheme, and when a channel environment is good, the RS may determine the second integration scheme.

When an MS has data to be transmitted to the BS, it transfers the data to the RS (S503), and the RS receives the data from the MS, classifies it into one or more integration packet classes according to a predetermined data integration scheme, and stores it in the queue of the RS (S505).

The RS sets delay requirements, FER requirements, and a maximum number of retransmissions with respect to the integration packet class classified according to the selected data integration scheme (S507). Here, the maximum number of retransmissions, the FER requirement values, and the like, of each of the integration packet classes may be previously set initially in the system, or may be periodically updated by the RS in consideration of a channel environment, or the like.

The RS calculates the amount of traffic to be processed and the amount of traffic of each of the integration packet classes, and determines an MCS (Modulation and Coding Scheme) level of each of the integration packet classes by using the RS-BS channel information, the maximum number of retransmissions, the FER requirement value, and the like (S509).

The RS calculates required resource according to the determined MCS level and request allocation of the resource from the BS (S511).

The BS allocates resource to the RS in consideration of the other RS which currently serves, and MSs (S513).

Preferably, the BS may determine the MCS level to be used in each of the integration packet areas in consideration of the RS-BS channel information, the maximum number of retransmissions of each integration packet class, the FER requirements, and the amount of traffic, allocate required resource to the RS, designate a position to which a particular integration packet is to be mapped in the allocated resource, and inform the RS about the designated position through a downlink map.

According to a different embodiment, as for the resource allocation, the BS may allocate the entire resources to be used by the RS and inform the RS accordingly, and then, the RS may determine the positions of the resource to be occupied by the respective integration packet classes and an MCS level and informs the BS accordingly. In this case, the RS may provide information regarding the positions of resources to be used by the respective packet classes and MCS level information to the BS through an uplink MAP message or a control channel. Details of the resource allocation will be described later in relevant portions.

Upon being allocated resources from the BS, the RS allocates resources to each integration packet class according to priority levels of the integration packet classes and the length of the queue in which the integration packet classes are stored (S515).

The RS determines the size of the integration packets according to the MCS level and the allocated resources of each of the integration packet classes (S517).

Thereafter, the integration packets of the respective integration packet classes are configured (S519), modulated and codes, mapped to resources (S521), and then, transmitted to the BS (S523).

Hereinafter, the method for determining QoS requirements for applying a technique such as HARQ to the integration packets reconfigured by the RS will be described.

III. Determination of QoS Requirements of Integration Packet

As shown in FIG. 3, in a direct link between the MS and the BS, the QoS requirements may be given by respective application services, but in the link between the RS and the BS, the QoS requirements must be newly designed according to an integration packet determining scheme in order to apply HARQ. As mentioned above, the integration packet includes a plurality of packets having various QoS requirements, so the QoS requirements of the integration packet are required to be appropriately set in consideration of a system environment. Hereinafter, a method for determining the QoS requirements of the integration packet in consideration of the delay requirements and the FER requirements will be described.

1. Configuration of Delay Requirements of Integration Packet ($D_{CONST,Agg}^{RS-BS}$)

Delay requirements of an integration packet may be determined by using a value of the total delay requirements ($D_{CONST}^{TOTAL}$) between the MS and the BS and an actual delay value ($D^{MS-RS}$) in the link between the MS and the RS.

First, when delay requirements ($D_{CONST}^{TOTAL}$) of a particular packet in consideration of the entire link between the MS and the BS are determined, the delay requirements ($D_{CONST}^{RS-BS}$) of the particular packet in consideration of the link between the RS and the BS are determined by using the actual delay value ($D^{MS-RS}$) in the link between the MS and the BS. The delay requirements in the link between the RS and the BS with respect to the particular packet received by the RS from the MS may be expressed by Equation 6 shown below:

$$D_{CONST}^{RS-BS} = D_{CONST}^{TOTAL} - D^{RS-BS} \quad \text{[Equation 6]}$$

$D_{CONST}^{RS-BS}$: Delay requirements in the link between the RS and the BS $D_{CONST}^{TOTAL}$: Total delay requirements in the link between the MS and the BS.

$D^{MS-RS}$: Actual delay value in the link between the MS and the RS

In Equation 6, $D_{CONST}^{TOTAL}$ is a value within an average delay or a certain percentile, and corresponds to a constant value given to each class.

The total delay requirements ($D_{CONST}^{TOTAL}$) in the link between the MS and the BS are selected based on the most strict delay requirements among the delay requirements specified in each class. For example, when the integration packet class of the third integration scheme is applied and the integration packet class B of Table 4 includes all of Class {A2, B2, A3, B3, A4, B4} among classes illustrated in FIG. 3, the integration packet class B should satisfy all the delay requirements of Class {A2, B2, A3, B3, A4, B4}, so the total delay requirements ($D_{CONST}^{TOTAL}$) is set to satisfy the delay requirements of Class A2 or Class B2 corresponding to the most strict delay requirements, among the delay requirements.

However, $D^{MS-RS}$ value must undergo independent processing at every packet in the MS-RS link, it corresponds to a variable value which is changed at every moment. Thus, $D_{CONST}^{RS-BS}$ must be determined through statistical estimation, and to this end, packets received by the RS must be sampled. In the packet sampling, only packets of a class that affects the determination of the delay requirements of the MS-BS link are sampled. For example, in case of the integration packet class B of the third data integration scheme as described above, since the delay requirements of Class A2 or Class B2 are the lowest, the delay requirements of the integration packet are obtained in consideration of only the packets corresponding to Class A2 or Class B2. For example, it is assumed that the delay requirements of Class A2 are the lowest, n number of packets belong to Class A2, and $D_{CONST}^{RS-BS}(n)$ is a value of delay requirements of nth packet. When the values are arranged in order, starting from the largest one, a value having a particular percentile is determined as the delay requirements $D_{CONST,Agg}^{RS-BS}$ of the integration packet. Preferably, when a plurality of values have the particular percentile, an average of the plurality of values may be set as the delay requirements of the integration packet.

Also, preferably, when the integration packet does not satisfy the delay requirements value, it may be regarded as a loss, so the percentile value may be set in consideration of the FER requirements. Namely, preferably, the delay requirements $D_{CONST}^{RS-BS}$ of the integration packet in the RS-BS link are set as a value smaller by $\alpha$ than the average in consideration of the loss, as expressed by Equation 7 shown below:

$$D_{CONST,Agg}^{RS-BS} = E[D_{CONST}^{RS-BS}] - \alpha \quad \text{[Equation 7]}$$

Here, $\alpha$ is a loss compensation coefficient and can be appropriately set as a constant value greater than 0 in consideration of a system environment.

When the number or retransmission is determined based on $D_{CONST,Agg}^{RS-BS}$, delay requirements of the packets within the particular percentile value can be satisfied. The foregoing particular percentile value is set to satisfy the delay requirements of most packets.

Also, the probability in which delay exceeds $D_{CONST,Agg}^{RS-BS}$ can be obtained as expressed by Equation 8 shown below:

$$P_{delay\ over}^{RS-BS} = P[D_{CONST,Agg}^{RS-BS} < D_{CONST}^{RS-BS}] \quad \text{[Equation 8]}$$

2. Configuration of FER Requirements of Integration Packet

The FER requirements are not a value which is changed every moment, and the lowest FER requirements among various FER requirements included in a single integration packet class are the FER requirements of the integration packet. For example, when Class {A2, B2, A3, B3, A4, B4} among the class groups of FIG. 3 are integrated into the integration packet class B of the third data integration scheme to configure the integration packet class B, the most strict FER requirements among the FER requirements of Class B2, Class B3 and Class B4 make the FER requirements ($FER_{const}$) of the integration packet class B.

Actually, packets are transmitted through all of the MS-RS link and the RS-BS link, so an error generated during a packet transmission may also be generated in the MS-RS link and the RS-BS link. Thus, the FER requirements of the RS-BS link may be expressed by Equation 9 shown below:

$$FER_{CONST}^{RS-BS} \approx FER_{CONST}^{MS-BS} - FER_{CONST}^{MS-RS} \quad \text{[Equation 9]}$$

In Equation 9, $FER_{CONST}^{MS-RS}$ is requirements of the MS-RS link of the class that affects the determination of the FER requirements of the integration packet.

Meanwhile, a value of FER requirements used for selecting an MCS level of HARQ may be determined as expressed by Equation 10 shown below in consideration of the value $FER_{CONST}^{RS-BS}$ and the value $P_{delay\ over}^{RS-BS}$ in Equation 8

$$FER_{CONST}^{HARQ} = FER_{CONST}^{RS-BS} - P_{delay\ over}^{RS-BS} \quad \text{[Equation 10]}$$

The FER values of Equation 10 may vary according to a system environment, so preferably, appropriate values may be set as the FER values through measurement.

IV. Determination of Maximum Number of Allowable Retransmissions ($N_{max}^{RS-BS}$) for HARQ As described above, when the RS configures an integration packet and transmits it to the BS, if there occurs an error in the packet, HARQ can be applied, and when the HARQ is applied, the number of retransmission ($N_{max}^{RS-BS}$) must be considered while satisfying the previously determined delay requirements.

A maximum number of retransmissions in the RS-BS link may be determined by Equation 11 shown below:

$$N_{max}^{RS-BS} = \left\lfloor \frac{D_{const,Agg}^{RS-BS} - E[D_{queuing}^{RS-BS}]}{E[D_{trans}^{RS-BS} + D_{Proc}^{RS-BS}]} \right\rfloor \quad \text{[Equation 11]}$$

In Equation 11, $D_{trans}^{RS-BS}$ is a transmission delay consumed in transmitting one frame in the RS-BS link, and $D_{Proc}^{RS-BS}$ is a processing delay required for processing a transmission of one frame in the RS-BS link. Thus, a time required for a single retransmission is the sum ($D_{trans}^{RS-BS}$+ $D_{Proc}^{RS-BS}$) of the transmission delay and the processing delay. Also, $D_{queuing}^{RS-BS}$ is a delay time the RS has waited until when it provides the corresponding packet.

In order to obtain the maximum number of retransmissions, an average value of these values is used. Or, for the sake of operation, the maximum number of retransmissions in the RS-BS link of each integration packet may be determined to be a maximum number of retransmissions in the MS-BS link of the packet mapped to the corresponding integration packet.

When the maximum number of retransmissions satisfying the delay requirements is determined, an appropriate MCS level can be determined by using the maximum number of retransmission.

V. Determination of MCS Level

When the delay requirements and FER requirements are determined for each integration packet class, an MCS level that may be able to maximize throughput while satisfying the delay requirements and the FER requirements should be determined. When it is defined that an expected throughput (ET) of a particular MCS level i is $ET_i(\gamma, N_{max}^{RS-BS})$ when the maximum number of retransmissions $N_{max}^{RS-BS}$ and an SNR value $\gamma$ are given, the ET may be expressed by Equation 12 shown below:

$$ET_i(\gamma, N_{max}^{RS-BS}) = \sum_{k=1}^{N_{max}^{RS-BS}} \frac{R_i}{k} \prod_{m=1}^{k-1} F_i\left(\sum_{i=1}^{m}\gamma_i\right)\left(1 - F_i\left(\sum_{i=1}^{k}\gamma_i\right)\right) \quad \text{[Equation 12]}$$

$R_i$: data ratio of MCS level i
$F_i(x)$: FER of MCS level i at instantaneous SNR, x
$\gamma_i$: instantaneous SNR of the i-th transmission With reference to Equation 12, if a channel environment is not changed at every m times of transmissions, $\gamma_i =$, and an error probability when m transmissions occur=$F_i(m\gamma)$, so Equation 12 can be simplified into, $$ET_i(\gamma, N_{max}^{RS-BS}) = \sum_{k=1}^{N_{max}^{RS-BS}} \frac{R_i}{k} \prod_{m=1}^{k-1} F_i(m\gamma)(1 - F_i(k\gamma))$$

However, when a channel environment is changed at every transmission, the error probability will become $$F_i\left(\sum_{i=1}^{m}\gamma_i\right),$$

so the respective $\gamma_i$ in Equation 12 may be averaged to be expressed by Equation 13 shown below:

$$ET_i(\gamma, N_{max}^{RS-BS}) = E\left[\sum_{k=1}^{N_{max}^{RS-BS}} \frac{R_i}{k} \prod_{m=1}^{k-1} F_i(m\gamma)(1 - F_i(k\gamma))\right] \quad \text{[Equation 13]}$$

The ET $ET_i(\gamma, N_{max}^{RS-BS})$ of Equation 13 is based on an environment in which the SNR is fixed and a chase combining technique is applied as HARQ. The chase combining technique is a scheme in which the entire packets comprised of systematic bits and parity bits are transmitted for a retransmission in the same manner as the initial transmission, and a receiver combines the retransmitted packets and packets previously received by a reception buffer according to a certain scheme and inputs the same to a decoder, whereby the transmission reliability of the bits input to the decoder can be improved to thus obtain a performance gain of the overall system.

FER of the MCS level i can be obtained as expressed by Equation 14 shown below:

$$FER_i(\gamma) = \prod_{m=1}^{N_{max}} F_i(m\gamma) \quad \text{[Equation 14]}$$

Equation 14 signifies a probability of an error although packets are transmitted via a channel in which an average SNR is $\gamma$ up to N_max times.

The probability value can be expressed by Equation 15 shown below when a channel environment is changed.

$$FER_i(\gamma) = E\left[\prod_{m=1}^{N_{max}} F_i(\gamma)\right] \quad \text{[Equation 15]}$$

Thus, when L is a set of MCS levels, an optimum MCS level can be obtained as expressed by Equation 16 shown below:

$$MCS_{ET}^{CC}(\gamma, N_{max}^{RS-BS}) = \arg_{i \in L}^{max} ET_i(\gamma, N_{max}^{RS-BS}) \text{ s.t. } FER_i \leq FER_{const}^{HARQ} \quad \text{[Equation 16]}$$

Namely, when values of $N_{max}^{RS-BS}$ and $FER_{const}^{HARQ}$ of respective integration packet classes are substituted for Equation 15, the MCS levels selected for each integration packet are different. In this manner, when the MCS level of HARQ is selected as described above, since the FER requirements, as well as the maximum number of retransmissions, are considered, an accurate MCS level can be selected even in a situation in which channels such as dynamical channels are rapidly changed.

VI. Resource Allocation and Management

Figure 6:
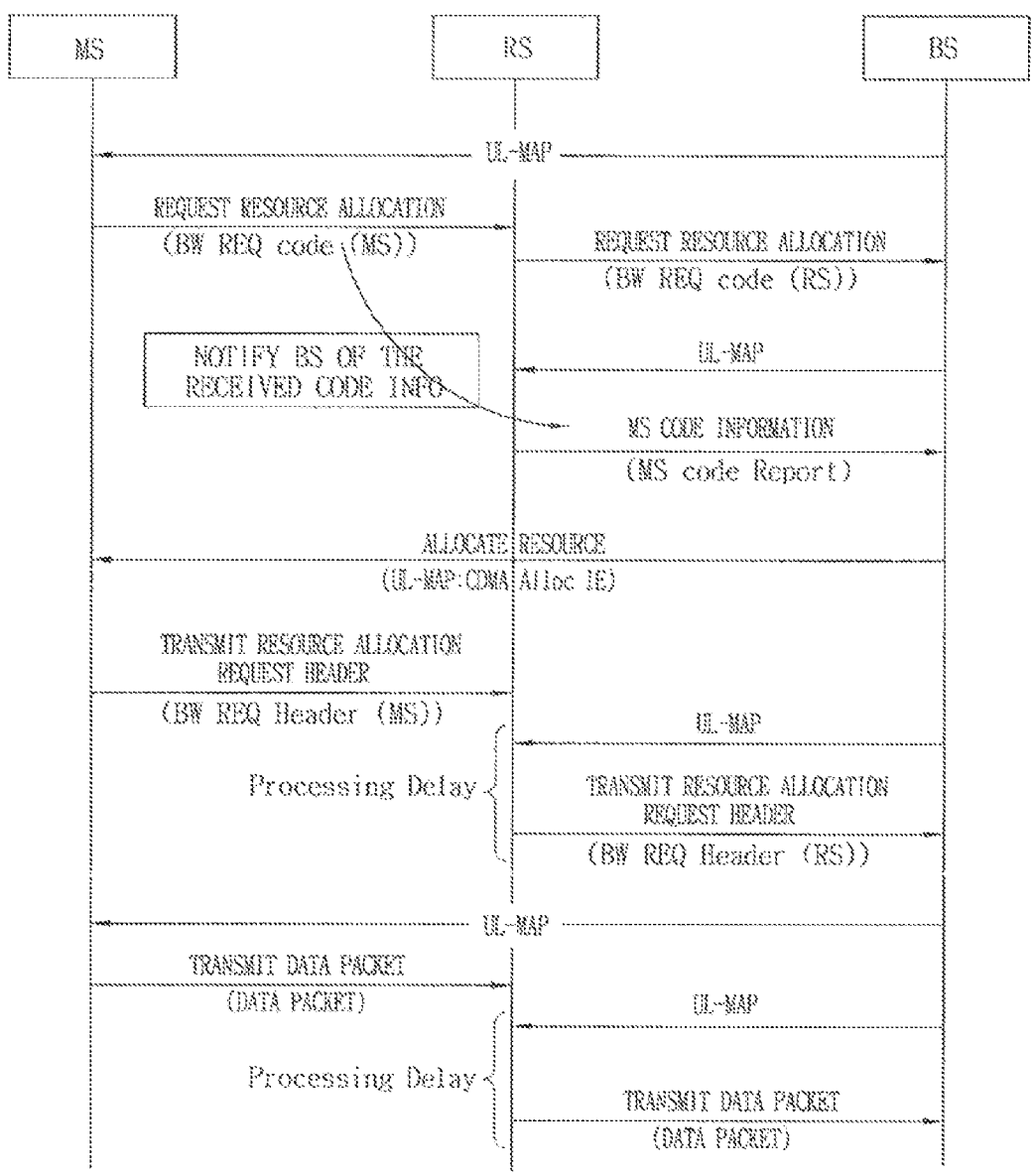
FIG. 6 is a flow chart illustrating the process of allocating resource according to centralized scheduling.

FIG. 6 is a flow chart illustrating the process of allocating resource according to centralized scheduling;

According to the centralized scheduling scheme illustrated in FIG. 6, when the MS 10 has data to be transmitted, it transmits a resource allocation request (BW REQ: Bandwidth Request) to the RS 20, and the RS 20 transmits the request to the BS 30. Then, the BS 30 determines resource allocation with respect to the MS 10 and transmits determined resources (CDMA Allocation Information Element). Thus, according to the centralized scheduling scheme, the BS manages every resource allocation with respect to the MS and the RE.

Figure 7:
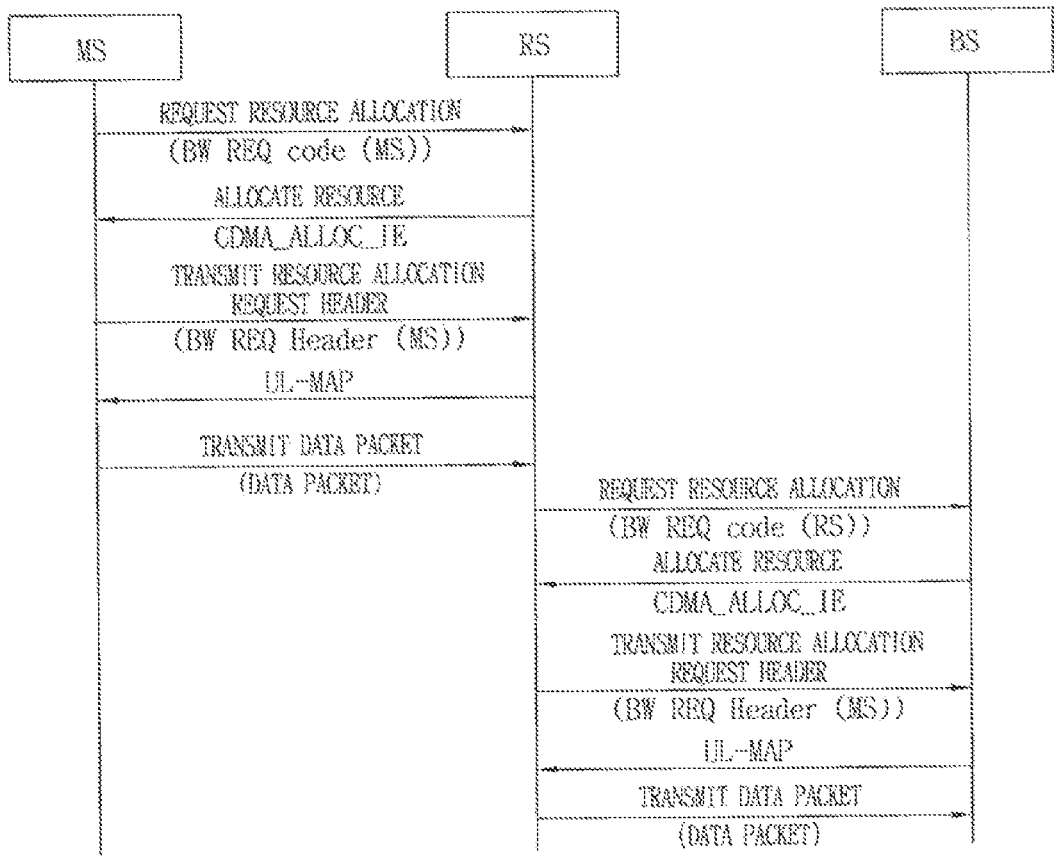
FIG. 7 is a flow chart illustrating a process of allocating resource according to distributed scheduling.

FIG. 7 is a flow chart illustrating a process of allocating resources according to distributed scheduling;

According to the distributed scheduling scheme illustrated in FIG. 7, in order to reduce overhead for the RS 20 to transmit the MS's request to the BS 30, the RS manages a channel link, i.e., radio resources, between the MS 10 and the RS 20. Namely, the RS 20 appropriately allocates resources to the MS 10 by using radio resources allocated thereto. And, the BS 30 manages the channel link, namely, the radio resources, between the BS 30 and the RS 20. Namely, the BS 30 allocates resources to the RS 20. The channel link is configured in units of frames. The channel link frame includes an initial maintenance opportunities area for initial ranging, i.e., a request contention opportunities area for maintenance ranging, i.e., periodical ranging and bandwidth request ranging, an SS scheduled data areas including uplink data of MSs and RSs.

Figure 8:
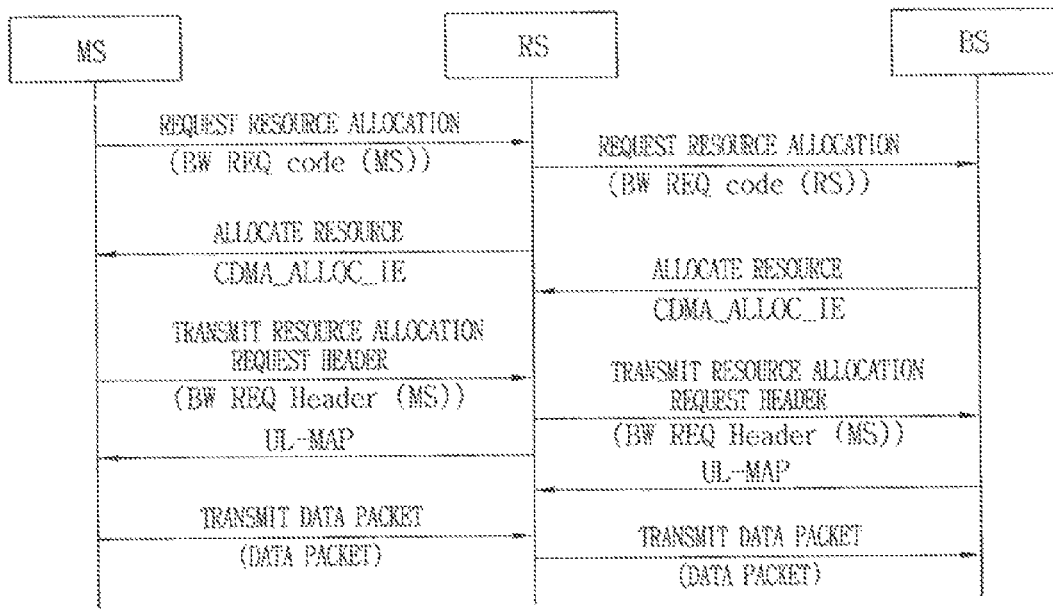
FIG. 8 is a flow chart illustrating a process of allocating resource according to distributed scheduling for reducing latency.

The RS 20 manages only MSs included in the RS 20 itself without having to transfer a resource request from the MSs to the BS 30, and the BS 30 manages only the RS 20 connected to the BS 30 itself FIG. 8 is a flow chart illustrating a process of allocating resource according to distributed scheduling for reducing latency.

According to the distributed scheduling for reducing latency, in order to reduce delay of the foregoing distributed scheduling scheme, the RS 20 previously requests resources between the RS 20 and the BS 30 from the BS 30 before receiving data from the MS 10, so that the RS 20 can transfer the data from the MS 10 to the BS 30 immediately when the data is received. Thus, the distributed scheduling for reducing latency can reduce delay compared with the distributed scheduling scheme in which the RS requests resource from the BS after successfully receiving data from the MS.

Figure 9:
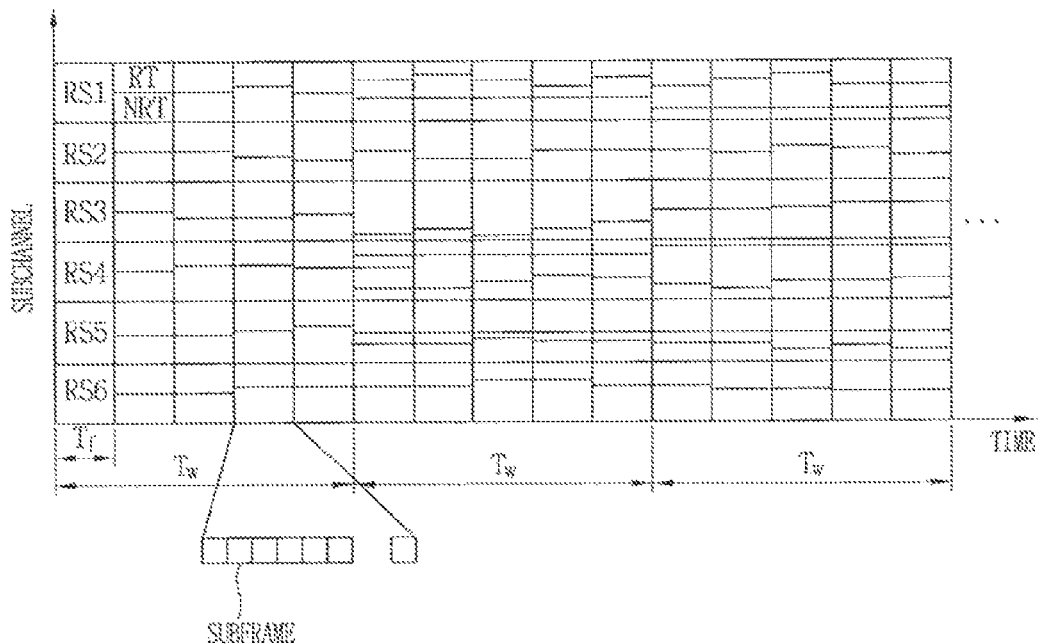
FIG. 9 is a view showing the concept of resource allocation and management according to an embodiment of the present invention.

FIG. 9 is a view showing the concept of resource allocation and management according to an embodiment of the present invention.

As shown in FIG. 9, in the present embodiment, dedicated resources are periodically allocated at every particular time window Tw in consideration of a channel situation, a traffic situation, i.e., the amount of transmission data, with respect to the RS-BS uplink. To this end, in the present invention, a resource allocation message transmitted by the BS to the RS is set to be valid during the particular time window Tw, and the RS can utilize the existing allocated resources without having to receive a resource allocation message at every frame time Tf during the corresponding valid period.

In the window-based virtual band multi-access scheme according to an embodiment of the present invention, the RS feeds back band information required for the entirety of real time traffic and non-real time traffic (data) at every particular time window Tw determined between the BS and RS, and the BS allocates a virtual band maintained within the particular time window Tw to the RSs at a band ratio requested from the RSs which has been fed back.

The particular time window Tw may be set based on various data, e.g., frequency of a reallocation request, traffic exceeding time slot information, or the like. As shown in FIG. 5, the particular time window Tw includes a pre-set number of frames (Tw=k×$T_f$). The frames include a plurality of times slots, a plurality of TTI (Transmission Time Interval), or a plurality of subframes.

Within the particular time window Tw, the RS performs transmission by using the allocated resources as the virtual band, unlike the related art, delay or signaling overhead for the RS to access the BS does not occur. However, feedback of requested band information updated at ever particular time window and resource reallocation are required.

When the RS is allocated resource which can be exclusively used within the particular time window Tw, first, the RS allocates the resource with respect to real-time traffic (data) by the estimated requested band, and allocates the other remaining resource with respect to non-real time traffic (data).

That is, the real-time traffic (or data) is preferentially processed so as not to be accumulated in the queue as possible, thus satisfying QoS of the real-time traffic (or data).

As described above, the window-based virtual band multi-access scheme can obtain the same effect as that when the allocated virtual band is exclusively used within the time window, thus reducing signaling overhead and delay with respect to a data transmission.

Hereinafter, various embodiments employing the window-based virtual band multi-access (W-VBMA) scheme with respect to RS-BS link will be described.

Figure 10:
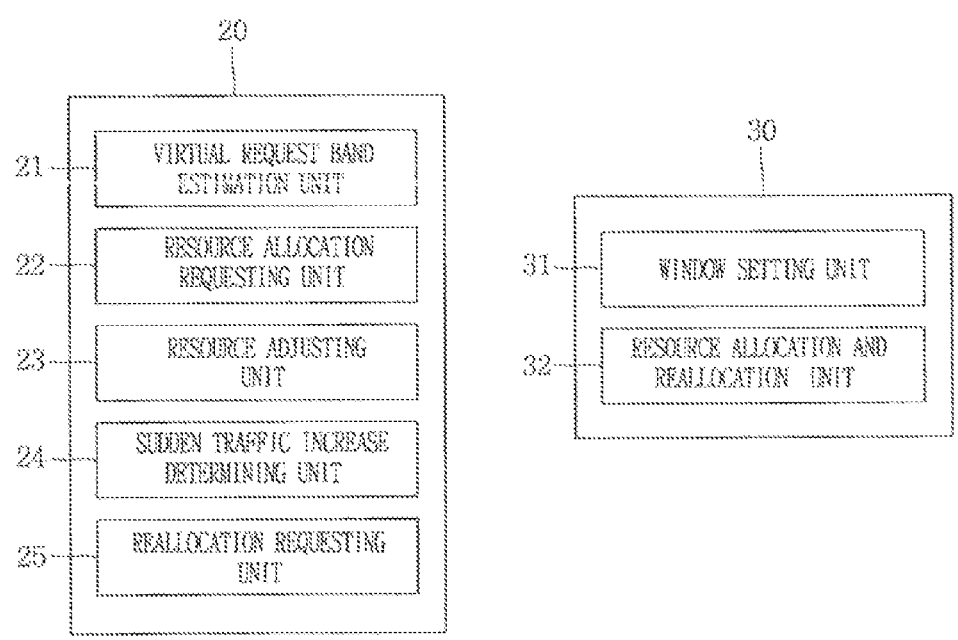
FIG. 10 is a conceptual block diagram showing the configuration of an RS and a BS according to an embodiment of the present invention.

FIG. 10 is a conceptual block diagram showing the configuration of an RS and a BS according to an embodiment of the present invention.

As shown in FIG. 10, the RS 20 includes a virtual request band estimation unit 21, a resource allocation requesting unit 22, a resource adjusting unit 23, a sudden traffic increase determining unit 24, and a reallocation requesting unit 25.

The virtual request band estimation unit 21 estimates the amount of traffic of the RS by traffic types. The resource allocation requesting unit 22 requests resource allocation from the BS 30 based on the estimated virtual request band, and is allocated resource.

The resource adjusting unit 23 divides the allocated resource by traffic types, and allocates the same to the respective MSs.

The sudden traffic increase determining unit 24 determines whether or not additional resource is immediately required because of a sudden increase in the amount of traffic.

When the reallocation requesting unit 25 determines that additional resource is required, the reallocation requesting unit 25 requests resource reallocation from the BS.

The BS 30 includes a window setting unit 31 and a resource allocation and reallocation unit 32.

The window setting unit 31 sets a particular time window Tw. In this case, in order to set the particular time window, various data, e.g., frequency of a reallocation request, traffic excess time slot information, and the like, may be used.

The resource allocation and reallocation unit 32 receives a resource allocation request and reallocation request from the RS 20 and allocates resource accordingly.

The conceptual configuration of the RS 20 and the BS 30 has been described. However, the conceptual configuration of the RS 20 and the BS 30 can be implemented physically by a combination of a processor (e.g., a CPU), a storage unit (e.g., a memory, a hard disk, an SSD (Solid State Disk)), or the like. Namely, the conceptual configuration of the RS 20 may be implemented as a program and stored in the storage unit, and may be executed by the processor.

Figure 11:
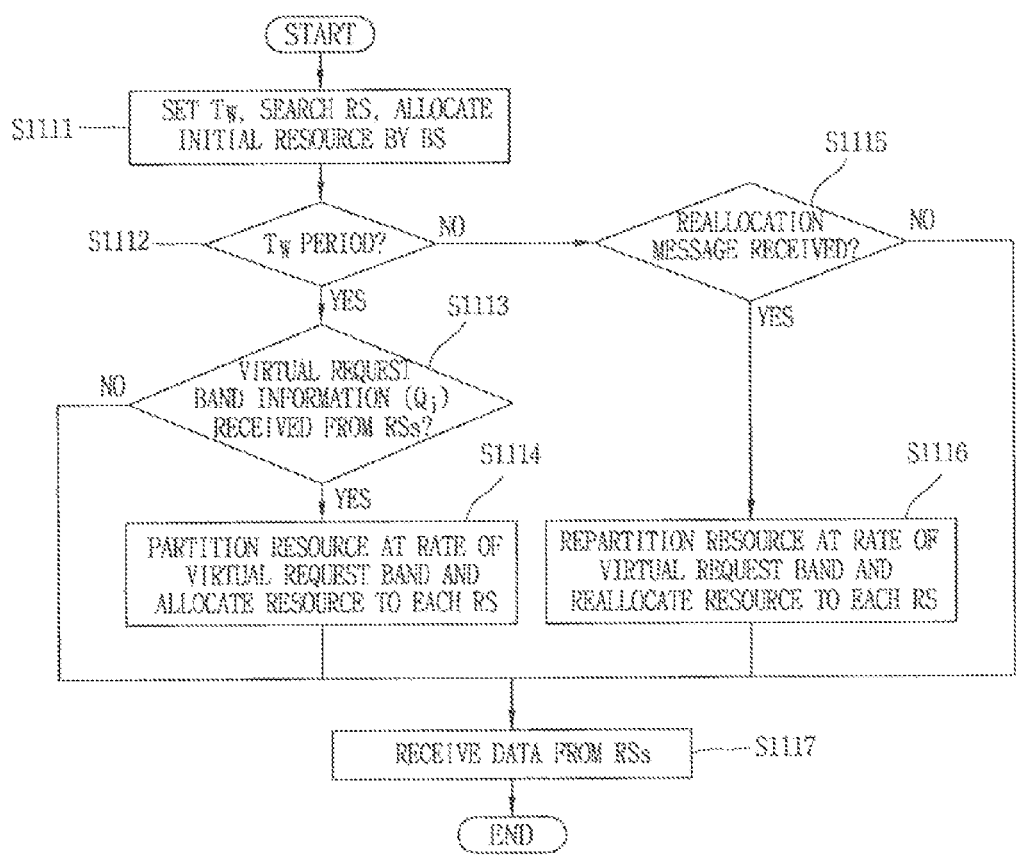
FIG. 11 is a flow chart illustrating an operation of a BS according to an embodiment of the present invention.

FIG. 11 is a flow chart illustrating an operation of a BS according to an embodiment of the present invention;

As illustrated, the BS 30 searches RSs, sets a time window Tw, and equally allocates initial resources to each RS 20 (S1111). The BS 30 provides the resource allocation information and the time window to each RS through a MAP for RS, namely, an R-MAP (Relay-MAP).

The R-MAP includes the allocated resource domain information and signal coding information. Here, the frames of the BS 30 may be divided into a downlink subframe and an uplink subframe, and each subframe is divided into an MS section and an RS section. An R-FCH (Relay-FCH) and the R-MAP are positioned at a start portion of the RS section.

Subsequently, the BS 30 receives virtual request band information Qi from each RS 20 at every time window Tw (S1112 to S1113). At this time, the RS 20 transmits the virtual request band information Qi to the BS 30 by using resources previously allocated to the RS 20.

The BS 30 divides the resources at the ratio of the received virtual request band Qi and allocates the resources to each RS (S1114). And, the BS 30 provides information regarding the allocated resource to each RS through the R-MAP.

Meanwhile, when the BS receives a reallocation message at a time not within the time window Tw (S1115), the BS 30 updates the virtual request band information received from the RSs during a previous time window with the virtual request band information requested by the RS and divides resources and reallocates the same (S1116). The BS informs the RSs about the resource reallocation by using the R-MAP. In this case, in order to prevent the time window from being changed, the BS 30 applies the reallocated resource only during the remaining period of time until the next time window, and when a current time is within the time window Tw, the BS 30 allocates resources by using the virtual request band information received from all of the RSs.

After allocating and reallocating resources, the BS 30 receives data in the allocated resource domain from the respective RSs (S1117).

Figure 12:
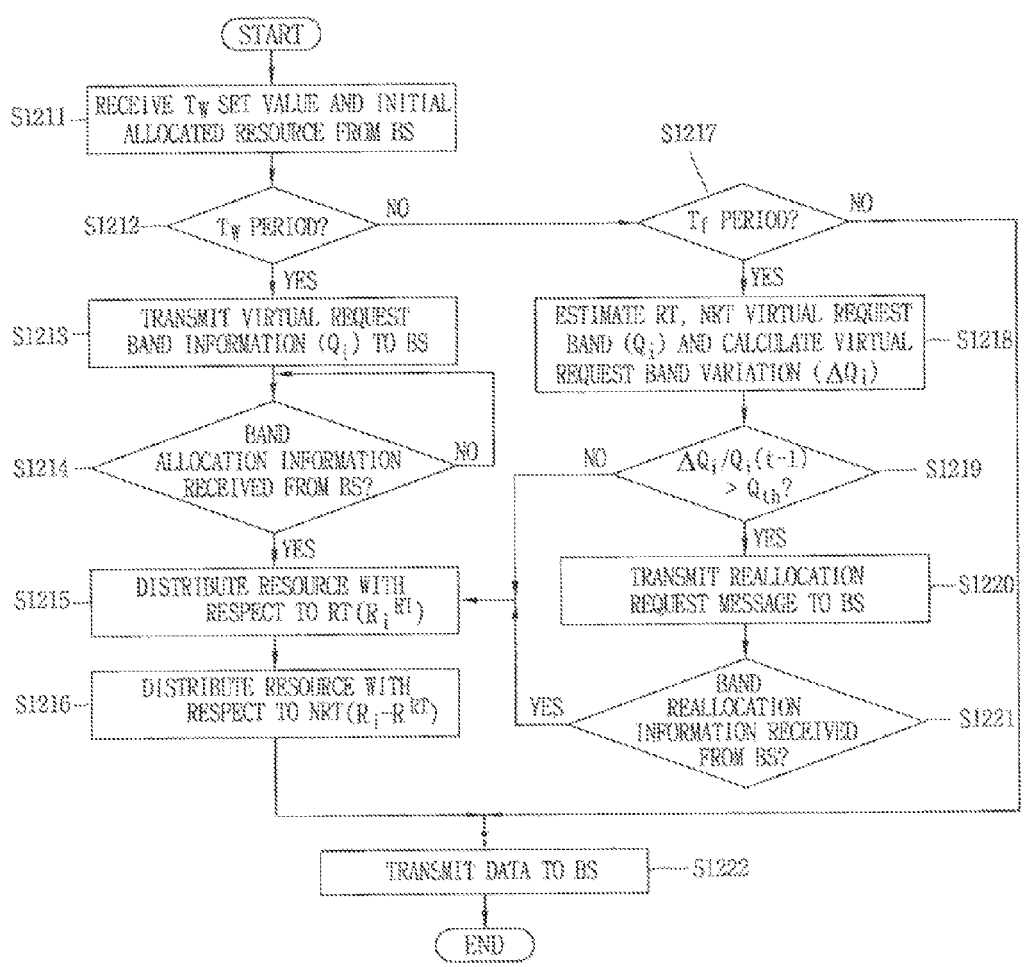
FIG. 12 is a flow chart illustrating an operation of an RS according to an embodiment of the present invention.

FIG. 12 is a flow chart illustrating an operation of an RS according to an embodiment of the present invention.

As illustrated, the RS 20 selects a BS that will serve the RS 20, and receives an initial resource allocation and time window Tw from the corresponding BS (S1211). These can be received through the R-MAP.

When a current time is within the time window Tw, the RS 20 feeds back the estimated average virtual request band information Qi to the BS 30 within the current time window (S1213).

Thereafter, when the RS 20 receives band allocation information from the BS through the R-MAP (S1214), the RS 20 divides the allocated resources by using the occupancy of its real time traffic queue and the occupancy of its non-real time traffic queue within the current frame time. In this case, the RS 20 preferentially allocates resource to the real-time traffic RT (S1215) and allocates the other remaining resource to the non-real time traffic NRT (S1216). Accordingly, the RS 20 reduces delay of the real-time traffic.

Meanwhile, although a current time is not within the time window Tw (S1212), when it corresponds to each frame time period Tf (S1217), unlike the BS 30, the RS 20 estimates a virtual request band Qi with respect to the real-time traffic and non-real time traffic and calculates a variation ΔQi (S1218).

When the variation over the current virtual request band exceeds a predetermined threshold value ($\Delta Q_i / Q_i(t-1) > Q_{th}$) (S129), the RS 20 transmits a reallocation request message including the current virtual request band information to the BS 20 (S1220).

When band reallocation information is received from the BS 30 through the R-MAP in response to the reallocation request message (S1221), resources are again distributed based on the occupancy information of the real-time traffic queue and non-real time traffic queue within the current frame time (S1215 and S1216)

Meanwhile, although the variation of the virtual request band is smaller than the threshold value (S1219), the RS 20 redistributes resources for real time and non-real time by reflecting the occupancy information of the real time traffic queue and the non-real time traffic queue within the current frame time (S1215 and S1216).

At a different period of time than the time window and the frame time period, the RS 20 transmits data to the BS by using allocated resources (S1222).

Figures 13, 14:
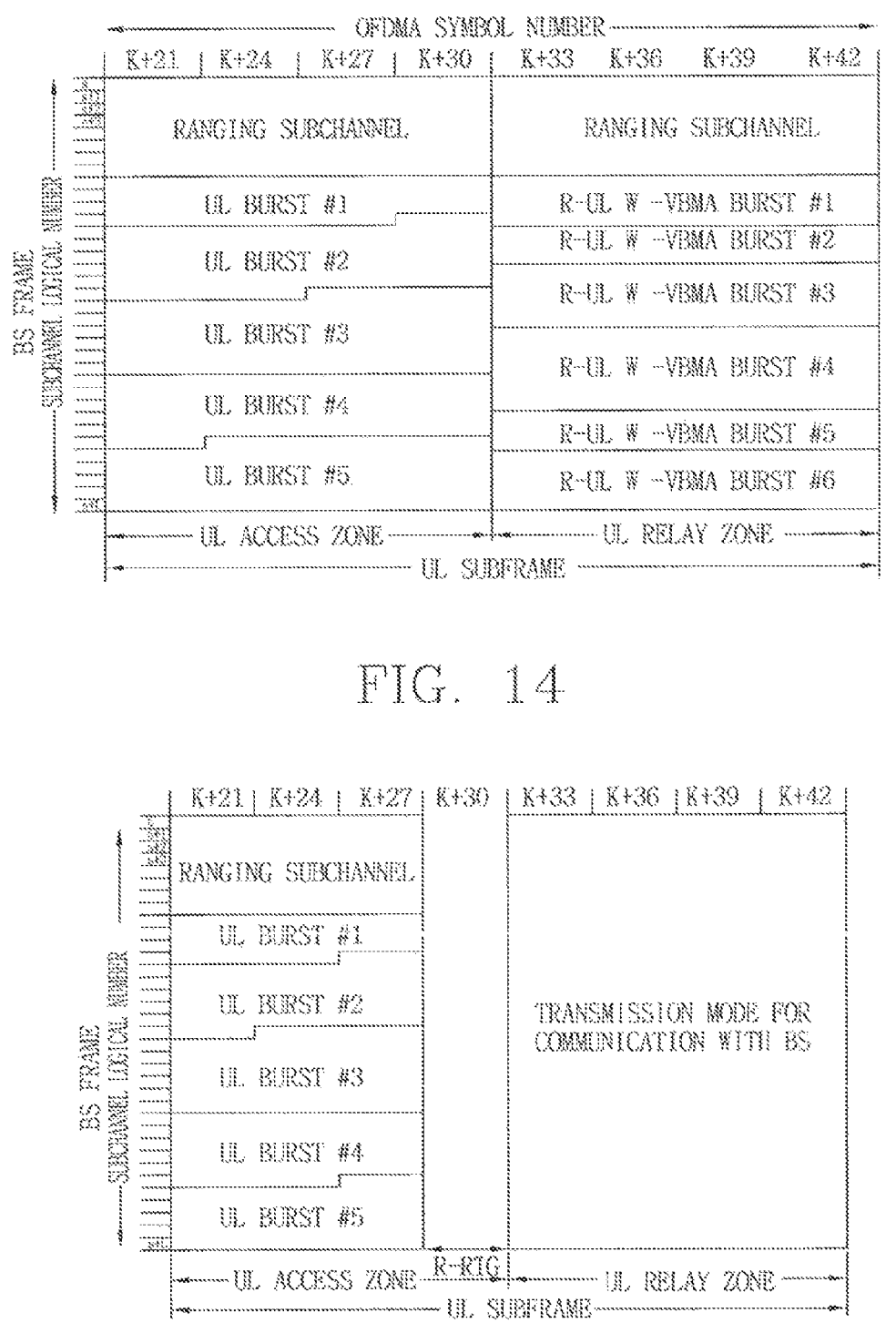

FIG. 13 is a view showing the structure of an uplink subframe of a BS according to an embodiment of the present invention, and FIG. 14 is a view showing the structure of an uplink subframe of an RS according to an embodiment of the present invention.

As shown in FIGS. 13 and 14, the resource of uplink subframe is divided into UL Access Zone and UL Relay Zone.

In FIG. 13, the UL Access Zone is used by an MS that directly served by the BS, and the UL Relay Zone is used by the RS included in the BS. The UL Access Zone corresponding to the MS-RS link is used according to the existing scheduling scheme. Meanwhile, the RS-BS link uses a window-based virtual band multi-access (W-VBMA) scheme.

In FIG. 14, the UL Access Zone is used by an MS served by the RS, and the UL Relay Zone is used for each RS to transmit uplink data to the BS. The UL Access Zone is used when the RS allocates resource to an MS based on scheduling.

Terms used in FIGS. 13 and 14 will now be described.

Ranging subchannel is resource used for synchronization, BW request, or the like, and UL burst (Uplink burst) refers to an uplink resource block allocated according to a scheduling scheme, R-UL W-VBMA burst refers to an RS-BS uplink resource block used by W-VBMA scheme, and UL Subframe refers to an uplink lower frame.

Hereinafter, the foregoing window-based virtual band multi-access (W-VBMA) according to an embodiment of the present invention will be described in more detail with reference to FIG. 15 and formulas.

Figure 15:
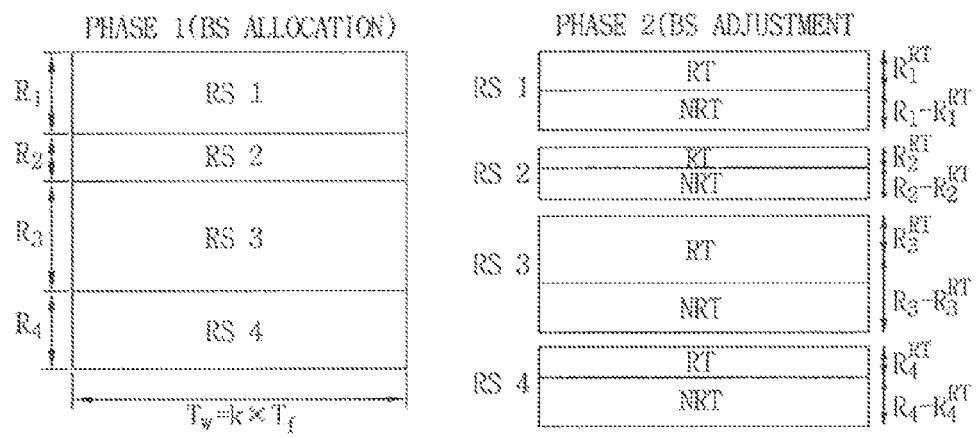
FIG. 15 is a view showing a window-based virtual band multi-access scheme as a chart according to an embodiment of the present invention.

FIG. 15 is a view showing a window-based virtual band multi-access scheme as a chart according to an embodiment of the present invention. In FIG. 15, in order to help understand the W-VBMA scheme, two phases are shown.

First, in a first phase (BS allocation), the BS 30 feeds back the size of a request band with respect to the entirety of real time and non-real time traffic from the RSs 20, and allocates resources of UL Relay Zone within the time window Tw as illustrated at the request band size ratio of each RS.

The size of the entire request bands ($Q_i$: the entire request bands of RS i) is the sum of a request band estimate value ($Q_i^{NRT}$) with respect to real-time traffic and a queue occupancy estimate value ($Q_i^{NRT}$) with respect to non-real time traffic. Thus, resource allocated to the RS I is determined by $$R_i = R \times \frac{Q_i}{Q}.$$

Here, R is the size of the entire resources allocated by the BS to the RSs, and Q is the sum $$\left(Q = \sum_i Q_i\right)$$

of the entire request band sizes of the RSs.

Examples of the request band estimate value ($Q_i^{RT}$) with respect to the real time traffic and the request band estimate value ($Q_i^{NRT}$) based on queue occupancy with respect to the non-real time traffic will be described in detail as follows.

In order to process the real-time traffic such that it is not accumulated in the queue as possible, a request band estimate value at a next time window is determined by a traffic amount estimate value of RSs at every time window. A request band estimate value with respect to real-time traffic of an RS i at a time window t is expressed by Equation 17 shown below:

$$Q_i^{RT}(t+1) = \alpha_i^{RT}(t) + \alpha \Delta \alpha_i^{RT}(t) \qquad \text{[Equation 17]}$$
$$= \sum_{k=1}^{|K|} n_k(t) \times v_k \times r_k \times T_f + \alpha \Delta \alpha_i^{RT}(t)$$

An estimate value of a band required for a next time window (t+1) at the time window t includes two terms. The two terms are the traffic generation estimate value ($Q_i^{RT}(t)$) of the real-time traffic at the time window t and a variation ($\Delta \alpha_i^{RT}(t)$) of the real-time traffic generation estimate value. $\alpha_i^{RT}(t)$ can be estimated by the RS from MSs which are connected to the RS and have real-time traffic. As in Equation 17, $$\alpha_i^{RT}(t) = \sum_{k=1}^{|K|} n_k(t) \times v_k \times r_k \times T_j,$$

wherein K is a set of real-time traffic classes, $n_k(t)$ is the number of MSs of a real-time traffic class k connected to the RS at the time window t, Vk is a factor ($v_k \in [0, 1]$) in consideration of activity, or the like, of the real-time traffic class k, $r_k$ is a peak data ratio of the real-time traffic class k, and $T_f$ is a frame time. As a result, $\alpha_i^{RT}(t)$ indicates the amount of real-time traffic estimated to be generated by the MSs in the RS I to be transmitted during a frame time at the time window t. Here, when $V_K$ is 1, it is estimated as a peak data rate, and when it is an average activity value of traffic classes, the value is estimated as an average data rate. The estimate value of the real-time traffic amount changes over time, since it is not an accurate value, it can be additionally adjusted by using its variation. In Equation 17, $\alpha \Delta \alpha_i^{RT}(t)$ corresponds the variation of the estimate value of the amount of real-time traffic, and sensitivity with respect to the variation can be adjusted by using $\alpha$. To this end, the RS is required to monitor traffic in units of frame time within the time window.

The non-real time traffic determines a request band size at a next time window by using the estimate value of the request bands based on the queue occupancy at the current time window. The request band size with respect to the non-real time traffic of the RS i at the time window t is determined by Equation 18 shown below;

$$Q_i^{NRT}(t+1) = \frac{[q_i^{NRT}(t+1)]}{[T_w/T_f]} + A_i^{NRT}(t+1) \qquad \text{[Equation 18]}$$
$$= \frac{[(q_i^{NRT}(t) + \alpha_i^{NRT}(t) - d_i^{NRT}(t))^+]}{[T_w/T_f]} +$$
$$A_i^{NRT}(t+1)$$

Here, $q_i^{NRT}(t+1)$ is the occupancy of non-real time traffic queue at a start point t+1, $A_i^{NRT}(t+1)$ is a traffic arrival estimate amount of non-real time traffic queue per frame time, and $[T_w/T_f]$ is the number of frames within the time window. Thus, $Q_i^{NRT}(t+1)$ is a request band estimate value for transmitting non-real time traffic by bit per frame at t+1. Here, $q_i^{NRT}(t=1) = q_i^{NRT}(t) + \alpha_i^{NRT}(t) - d_i^{NRT}(t))^+$, $q_i^{NRT}(t)$ is non-real time traffic queue occupancy at start point t, $\pi_i^{NRT}(t)$ is traffic arrival amount of the non-real time traffic queue during the time window at t, and $d_i^{NRT}(t)$ is a service amount of non-real time traffic queue during the time window at t. $A_i^{NRT}(t+1)$ may be estimated by a value obtained by monitoring a value at each frame time by the RS within a previous time window, and can be expressed by an average value and a variation as expressed by Equation 19 shown below:

$$A_i^{NRT}(t+1) = \overline{A}_i^{NRT}(t) + \alpha \times \Delta A_i^{NRT}(t) \qquad \text{[Equation 19]}$$

Here, $\overline{A}_i^{NRT}(t)$ is an average value of arrival amount of the non-real time traffic queue per frame at the time window t, and $\Delta A_i^{NRT}(t)$ is a variation. Sensitivity with respect to a variation can be adjusted by using $\alpha$.

Meanwhile, in the second phase (RS adjustment), the RS first allocates resources, which have been allocated from the BS, by the size ($R_i^{RT}$) of required resource determined by the queue occupancy with respect to its real-time traffic at the current frame time, and then, allocates the remaining resource with respect to non-real time traffic to thus transmit actual data to the BS. This aims at satisfying QoS of the real-time traffic by preferentially transmitting the real-time traffic so as not to be accumulated in the queue as possible. Here, $R_i^{RT}$ is determined by Equation 20 shown below:

$$R_i^{RT} = \begin{cases} \Phi(q_i^{RT}), & \text{if } \Phi(q_i^{RT}) < R_{i,max}^{RT} \\ R_{i,max}^{RT}, & \text{otherwise} \end{cases} \qquad \text{[Equation 20]}$$

Here, $\phi(\bullet)$ is a function of transforming queue occupancy in bit unit into a minimum unit (i.e. PUSC slot) of resource in consideration of MCS (Modulation and Coding Scheme) according to a channel, $q_i^{RT}$ indicates occupancy of real-time traffic queue in bit unit in a current frame, $R_{i,max}^{RT} = \beta R_i$, and $R_{i,max}^{RT}$ is a maximum resource allocation size with respect to real time traffic of RS i. This value can be adjusted according to $\beta \in [0,1]$. Thus, in Equation 20, $R_i$, $R_i^{RT}$, $R_{i,max}^{RT}$ are determined by the number of slots, minimum unit of resource. When the size ($R_i^{RT}$) of the resource with respect to real time traffic is determined, the other remaining resource, among the entire resources ($R_i$) the RS have been allocated, is determined as the size ($R_{i,max}^{RT}$) of the resource with respect to the non-real time traffic. Thus, the size of resource with respect to the non-real time traffic is $R_i^{NRT} = R_i - R_i^{RT}$. And then, the RS transmits real-time, non-real time merged traffic to the BS by using the resources divided according to the first and second phases (phase 1 and phase 2). The first phase is performed by the BS at every predetermined time window, and the second phase is performed by the RS at every frame time. The time window may be adjusted by the BS according to a channel, traffic situation.

When traffic is rapidly increased in each RS so it cannot wait for a next time window, resource must be reallocated immediately. In order to support this, each RS calculates a variation as well as estimating a virtual require band at every frame time. The variation of the virtual request band is calculated by Equation 21 shown below:

$$\Delta Q_i(t; n) = Q_i\left(t + \frac{n \cdot T_f}{T_w}\right) - Q_i(t) \qquad \text{[Equation 21]}$$

Here, i is an RS index, t is a current time window, and n is nth frame within the current window (n=1, 2, . . . , $T_w/T_f$).

Thus, ΔQ(t,n) is a numerical value indicating how high the virtual request band has been increased in the current frame from the virtual request band ($Q_i(t)$) at a previous time window (t−1).

The rapid increase in the variation of the virtual request band is determined by Equation 22 shown below:

$$T_i(t;n) = \frac{\Delta Q_i(t;n)}{Q_i(t)} > Q_{th}, Q_{th} \in_\chi^+ \quad \text{[Equation 22]}$$

Here, $T_i(t;n)$ is a variation test value in nth frame of time window t, and when this value is greater than $Q_{th}$, a real number ($x^+$) factor greater than pre-set 0, it is determined that traffic has been rapidly increased. Thus, $Q_{th}$ may be regulated to adjust sensitivity of the variation determination. When it is determined that the traffic has been rapidly increased, the RS transmits a reallocation request message including the current virtual request band $Q_i(t;n)$ estimated with respect to the nth frame of the time window t to the BS. Upon receiving the reallocation request message, the BS updates the virtual band information received from the RSs during a previous time window with the virtual band information of the corresponding RS received from the reallocation request message to reallocate resource, and informs each RS accordingly by using an R-MAP. Through this process, even when traffic is suddenly rapidly increased in a particular repeater, the situation can be immediately handled.

In the above description, the window-based virtual band multi-access scheme according to an embodiment of the present invention is applied to the RS-BS link, but the window-based virtual band multi-access scheme according to an embodiment of the present invention can also be applicable to a BS-MS link. Namely, the BS can allocate resource to the MS according to the window-based virtual band multi-access scheme. Similarly, the window-based virtual band multi-access scheme according to an embodiment of the present invention can also be applicable to an RS-MS link. Namely, the BS may allocate certain virtual band to the RS, and the RS may perform transmission and reception with its MSS within the allocated virtual band.

As described above, when the data integration scheme, the MCS level, or the like, of the integration packet are determined, in order to transfer the integration packet to the BS, the RS is allocated resource from the BS and transfers the packet. For the resource allocation, the BS may determine a resource domain, an MCS level, or the like, of each integration packet and inform accordingly, or the RS may determine a resource domain and an MCS level to be used by respective integration packets in consideration of a current channel state or traffic situation and informs the BS about the determination content through an uplink signal.

1. Determination of Resource Allocation Scheme by Bs

An RS determines a data integration scheme according to a channel situation of RS-BS and informs a BS accordingly. The BS may already calculate to know values of $N_{max}^{RS-BS}$ and $FER_{const}^{HARQ}$ with respect to each of the integration packet classes at an initial stage of the system configuration, but preferably, the RS updates these values $N_{max}^{RS-BS}$ and $FER_{const}^{HARQ}$ at every certain time and informs the BS accordingly.

The RS calculates the total amount of traffic to be processed and the amount of traffic of each of the integration packet classes and informs the BS about the calculation results, thus requesting resources.

The BS determines an MCS level to be used at each integration packet area in consideration of the channel information of RS-BS, the values of $N_{max}^{RS-BS}$ and $FER_{const}^{HARQ}$ of each integration packet class, and the traffic amount, determines resources to be allocated to the RS, and determines positions to which the integration packets are to be mapped in the resources to be allocated.

Preferably, the BS creates integration packet areas as many as the integration packet classes. Thus, the BS informs a particular RS about the position of resource to be used by the RS, positions of the resources to which the respective integration packet classes are to be mapped, and MCS information through a downlink MAP. The BS may be able to perform scheduling on transmissions of two or more different integration packet classes through an uplink grant message transmitted to the particular RS at a particular timing.

Figure 16:
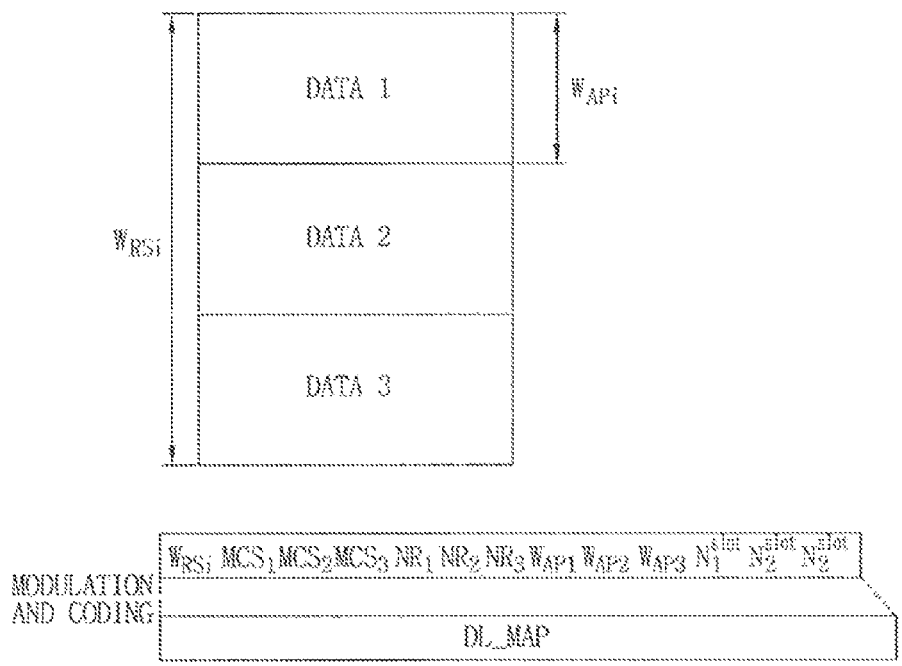
FIG. 16 is a view showing a method for mapping resources of an integration packet according to an embodiment of the present invention.

FIG. 16 is a view showing a method for mapping resources of an integration packet according to an embodiment of the present invention In this embodiment, the BS determines resource allocation of an integration packet and informs the RS accordingly through DL MAP, and this will be described based on the second integration scheme among the integration packet configuration methods of the RS as described above.

In the second integration scheme among the data integration schemes, an integration packet comprised of three classes is generated, so three types of different MCS levels may be used. Thus, three divided integration packet areas are required. As shown in FIG. 16, $W_{RSi}$ is a band of resource allocated for ith RS among a plurality of RS, and $W_{APi}$ is a band (position) of resource allocated for ith integration packet is allocated. As illustrated, the boundary of resource to be used by the integration packet may be divided into bands or may be divided into the number of slots, a minimum unit of a resource block. This is determined by the BS. Also, the values determined by the BS should be fixedly maintained during a retransmission, and may be updated at certain time intervals according to a channel situation and traffic amount. Also, different MCS levels may be applied to different integration packet areas ($W_{APi}$). One integration packet area may not be constantly limited to a particular integration packet class but may be flexibly used. Also, DATA is a portion in which data of ith integration packet is included.

Resource allocation band information ($W_{RSi}$), the number ($N_i^{slot}$) of slots allocated to the ith integration packet, the number of retransmissions, the MCS level information, resource allocation information, and the like, may be included in the DL MAP and transmitted from the BS to the RS.

Preferably, the BS may perform scheduling such that one RS can transmit several integration packets at a timing (e.g., subframe). However, when it is difficult to transmit all of a plurality of integration packets at a single timing, the BS may perform scheduling such that only one integration packet is transmitted at one timing and different integration packet classes are transmitted at different timings. When the BS performs scheduling such that different integration packet classes are transmitted at different timings, control information indicating to which integration packet class each transmission timing is allocated to transmit it may be exchanged between the BS and the RS, or the BS may include a class indicator indicating an integration packet of which certain class is to be transmitted in a MAP message transmitted by the BS at every timing.

In order to satisfy the time delay requirements of each class, when the maximum number of retransmissions is set, time waiting up to an integration packet transmission timing of a corresponding class is additionally reflected to be set.

2. Determination of Resource Allocation by RS

When the RS determines resource allocation, the entire resources that may be used by the RS are allocated from the BS, and the positions of resources to be used by respective integration packets and the MCS levels are determined by the RS and the RS informs the BS accordingly. Here, the RS may include the information regarding the positions of resources to be used by the respective integration packets and the MCS levels in MAP information or control information through a control channel and transmit the same along with the integration packets to the BS. Hereinafter, the procedure of determining resource allocation by the RS and informing the BS accordingly will be described in detail.

First, the RS determines a data integration scheme according to a channel situation of RS-BS.

The values $N_{max}^{RS-BS}$ and $FER_{const}^{HARQ}$ of each of the integration packet classes may be calculated at an initial stage of system configuration or may be updated at every certain time.

The RS calculates a total amount of traffic to be processed by the RS itself and the amount of traffic of each of the integration packet classes, and determines the MCS levels of the integration packet classes by using the channel of RS-BS and the $N_{max}^{RS-BS}$ and $FER_{const}^{HARQ}$ information.

The RS calculates the size of the entire required resources based on the determined MCS level information and requests it from the BS. Then, the BS allocates resources to the BS in consideration of the requested size of the resources.

The RS divides the resources allocated from the BS into areas as many as the integration packet classes in consideration of the amount of traffic of the respective integration packet classes and the MCS levels. Thereafter, the RS provides information regarding the positions of the resources to which the respective integration packet classes are to be mapped, the MCS information of each of the integration packet classes, and NR information to the BS through uplink MAP.

Preferably, information of the MAP information of each integration packet area, such as the position of the MAP information, the size of the MAP information area, and the MCS level, can be fixed such that the BS can easily receive the MAP information of each integration packet area, or can be selected among a limited number of possible cases.

FIG. 17 is a view showing a method for mapping resources of an integration packet according to an embodiment of the present invention. In the present embodiment, the RSS determines resource allocation of an integration packet and informs the BS accordingly through a UL MAP, and this will be described based on the second integration scheme among the integration packet configuration methods of the RS as described above.

$W_{RSi}$ is a band of resource allocated for the ith RS among a plurality of RSs, and $N_i^{slot}$ is the number of slots allocated to ith integration packet. As illustrated, the resources to be used by the integration packet may be divided according to the number of slots or frequency bands, and this may be determined by the RS or the BS.

In the second integration scheme, among the data integration schemes, three integration packets are created, so three different types of MCS levels may be used. DATA is a portion in which data of ith integration packet is included, and when the second integration scheme is used, three divided integration packet areas are required as illustrated.

Through UL MAP, resource allocation band information, the number of slots allocated to the ith integration packet, the number of retransmissions, the MCS level information, information regarding the size of allocated resources, and the like, may be included and transmitted from the RS to the BS. In FIG. 17, the size of MAP may be defined by the number of slots that can be used.

VII. Data Transmission Apparatus

FIG. 18 is a schematic block diagram of a data transmission apparatus according to an embodiment of the present invention.

As shown in FIG. 18, an RS which reconfigures packet data received from an MS into an integration packet and transmits the integration packet to a BS includes a controller 801, a transceiver 803, and a memory 805.

The transceiver 803 transmits and receives data to and from the MS and the BS.

The memory 805 stores data transmitted to and received from the MS and the BS, and stores a certain data integration scheme for integrating a plurality of packet data received from the MS and transmitting the same to the BS. As the data integration scheme, the embodiments as described above with reference to Table 2 to Table 4 can be applied.

The controller 801 configures an integration packet according to an embodiment of the present invention in order to transmit data received from the MS to BS, and controls data transmission and reception.

Preferably, the controller 801 classifies packet data received by the transceiver 803 into one or more integration packet classes according to the data integration scheme and stores them, and modulates and codes the integration packet classes to configure an integration packet, and transmits the integration packet to the BS through the transceiver 803.

The method according to exemplary embodiments of the present invention described thus far may be implemented by software, hardware or a combination thereof. For example, the method according to exemplary embodiments of the present invention may be stored in a storage medium (e.g., an internal memory of an MS, a flash memory, a hard disk, or the like), and may be implemented by codes or commands in a software program that can be executed by a processor (e.g., a microprocessor of an MS)).

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A method for transmitting data by a relay station (RS) in a multi-hop relay communication system, the method comprising:
   determining a data integration scheme for a transmission of a plurality of packet data received from a mobile station (MS) to a base station (BS);
   receiving packet data from the MS, classifying the received packet data into one or more integration packet classes according to the data integration scheme determined, and storing the classified integration packet class;

determining QoS (Quality of Service) requirements and a MCS (Modulation and Coding Scheme) level of the stored integration packet class;

calculating required resource according to the determined MCS level and requesting an allocation of the resource from the BS;

receiving an approval for resource allocation from the BS, and constructing an integration packet by modulating and coding the integration packet class and by mapping the integration packet class to the resource; and transmitting, to the BS, the integration packet constructed.

2. The method of claim 1, wherein the data integration scheme is determined based on data delay requirements and FER (Frame Error Rate) requirements in the step of determining the data integration scheme.

3. The method of claim 1, wherein the QoS requirements of the integration packet class includes the delay requirements and FER requirements, and the delay requirements of the integration packet are determined based on the most strict delay requirements among delay requirements of the respective integration packet classes included in a corresponding integration packet.

4. The method of claim 3, wherein the step of determining of the QoS requirements and the MCS level of the integration packet class comprises:

determining a maximum number of allowable retransmissions for an HARQ (Hybrid Automatic Retransmission request), wherein the maximum number of allowable retransmissions is determined in consideration of a transmission delay consumed for transmitting a frame in an RS-BS link, a processing delay required for processing a transmission of a frame in the RS-BS link, and a delay time taken for providing a corresponding packet from the RS.

5. The method of claim 1, wherein, in the step of constructing the integration packet, the BS designates positions to which one or more integration packet classes included in the integration packet are to be mapped in the allocated resource domain and informs the RS about the positions through a downlink map.

6. A method for transmitting data by a relay station (RS) in a multi-hop relay communication system, the method comprising:

determining a data integration scheme for a transmission of a plurality of packet data received from a mobile station (MS) to a base station (BS);

receiving packet data from the MS, classifying the received packet data into one or more integration packet classes according to the data integration scheme determined, and storing the classified integration packet class;

determining QoS (Quality of Service) requirements and a MCS (Modulation and Coding Scheme) level of the stored integration packet classes;

calculating required resources according to the determined MCS level and requesting an allocation of the resources from the BS;

mapping the resources allocated by the BS to each of the integration packet classes according to the amount of traffic and an MCS level of the integration packet classes receiving allocated resources from the BS and; and transmitting, to the BS through an uplink map, information regarding the MCS level and the mapping positions of the resources for the integration packet classes.

7. The method of claim 6, wherein the data integration scheme is determined based on data delay requirements and FER (Frame Error Rate) requirements in the step of determining the data integration scheme.

8. The method of claim 6, wherein the QoS requirements of the integration packet class includes the delay requirements and FER requirements, and the delay requirements of the integration packet are determined based on the most strict delay requirements among delay requirements of the respective integration packet classes included in a corresponding integration packet.

9. An apparatus for relaying data from a mobile station (MS) to transmit the data to a base station (BS) in a multi-hop relay communication system, the apparatus comprising:

a transceiver transmitting and receiving data to and from the MS and the BS;

a memory storing a certain data integration scheme for integrating the data transmitted to the MS and received from the BS and a plurality of packet data received from the MS according to a certain scheme so as to be transmitted to the BS; and a controller configuring an integration packet in order to transmit data received from the MS to the BS and controlling a data transmission and reception, wherein the controller classifies packet data received by the transceiver into one or more integration packet classes according to the data integration scheme and stores the packet data classified into one or more integration packet classes, modulates and codes the integration packet classes to configure the integration packet, and transmits the configured integration packet to the BS through the transceiver.

10. The apparatus of claim 9, wherein the controller determines the data integration scheme including one or more integration packet classes based on data delay requirements and FER (Frame Error Rate) requirements, and stores the determined data integration scheme in the memory.

11. The apparatus of claim 9, wherein the controller determines the delay requirements and the FER requirements of the integration packet class, and the delay requirements of the integration packet are determined based on the most strict delay requirements among delay requirements of the respective integration packet classes included in a corresponding integration packet.

* * * * *